(12) United States Patent (10) Patent No.: US 11,667,467 B2
Skocypec et al. (45) Date of Patent: * Jun. 6, 2023

(54) ELECTRICALLY-POWERED WASTE ENCLOSURE

(71) Applicant: Big Belly Solar LLC, Needham, MA (US)

(72) Inventors: David J. Skocypec, Medfield, MA (US); Michael E. Feldman, Framingham, MA (US); Jeffrey T. Satwicz, Weston, MA (US)

(73) Assignee: Big Belly Solar LLC, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,368

(22) Filed: Aug. 16, 2021

(65) Prior Publication Data

US 2021/0371195 A1 Dec. 2, 2021

Related U.S. Application Data

(63) Continuation of application No. 16/534,463, filed on Aug. 7, 2019, now Pat. No. 11,091,318, which is a (Continued)

(51) Int. Cl.
*G05B 15/02* (2006.01)
*B65F 1/12* (2006.01)
(Continued)

(52) U.S. Cl.
CPC ............ *B65F 1/12* (2013.01); *B65B 67/1233* (2013.01); *B65B 67/1238* (2013.01); *B65F 1/04* (2013.01); *B65F 1/06* (2013.01); *B65F 1/08* (2013.01); *B65F 1/1426* (2013.01); *B65F 1/1405* (2013.01); *B65F 2210/124* (2013.01);
(Continued)

(58) Field of Classification Search
CPC .. B65F 1/06; B65F 1/08; B65F 1/1426; B65F 2210/1443; B65F 2210/168; B65F 2210/172; B65F 2210/20; B65F 2210/128; G05B 19/048; G05B 2219/24015

See application file for complete search history.

(56) References Cited

U.S. PATENT DOCUMENTS 2,125,122 A 7/1938 Luigi
3,779,419 A 12/1973 Heitz
(Continued)

FOREIGN PATENT DOCUMENTS

DE 20110465 2/2002

*Primary Examiner* — Tuan A Vu

(57) ABSTRACT

Systems, methods, and apparatuses for controlling electrically-powered trash receptacles and monitoring fullness levels. The system can include a storage enclosure and a bin contained inside the storage enclosure, the bin configured to receive and store items deposited in the storage enclosure, wherein an inside portion of the bin is at least partially covered by a bag placed inside the bin to hold the items deposited in the storage enclosure. The system can also include a sensor configured to sense a content fullness state of the bin and a processor configured to control operations performed by the sensor. In addition, the system can include a sleeve configured to be installed over an inside portion of the bin and the bag, the sleeve at least partially restricting a movement of the bag.

20 Claims, 11 Drawing Sheets

Related U.S. Application Data continuation of application No. 15/310,846, filed as application No. PCT/US2015/030745 on May 14, 2015, now Pat. No. 10,377,565.

(60) Provisional application No. 61/993,844, filed on May 15, 2014.

(51) Int. Cl.

| | | |
|---|---|---|
| *B65F 1/08* | (2006.01) | |
| *B65B 67/12* | (2006.01) | |
| *B65F 1/04* | (2006.01) | |
| *B65F 1/06* | (2006.01) | |
| *B65F 1/14* | (2006.01) | |
| *G05B 19/048* | (2006.01) | |

(52) U.S. Cl.
CPC ... *B65F 2210/128* (2013.01); *B65F 2210/139* (2013.01); *B65F 2210/1443* (2013.01); *B65F 2210/1525* (2013.01); *B65F 2210/168* (2013.01); *B65F 2210/172* (2013.01); *B65F 2210/20* (2013.01); *G05B 19/048* (2013.01); *G05B 2219/24015* (2013.01)

(56) References Cited

U.S. PATENT DOCUMENTS

| | | |
|---|---|---|
| 4,753,367 A | 6/1988 | Miller et al. |
| 5,419,453 A | 5/1995 | Lochridge |
| 5,598,942 A | 2/1997 | Cowie |
| 5,816,431 A | 10/1998 | Giannopoulos |
| 2003/0226884 A1 | 12/2003 | Swider et al. |
| 2004/0195309 A1 | 10/2004 | Wagner |
| 2007/0101875 A1 | 5/2007 | Poss |
| 2008/0000911 A1 | 1/2008 | Bailey |
| 2008/0179330 A1 | 7/2008 | Brooks |
| 2011/0297017 A1 | 12/2011 | Brown |
| 2013/0278067 A1 | 10/2013 | Poss et al. |
| 2014/0125490 A1 | 5/2014 | Ullrich et al. |

ELECTRICALLY-POWERED WASTE ENCLOSURE

CROSS REFERENCE TO RELATED APPLICATION

This application is a continuation of U.S. patent application Ser. No. 16/534,463, filed Aug. 7, 2019, which is a continuation of U.S. patent application Ser. No. 15/310,846, filed Nov. 14, 2016, now U.S. Pat. No. 10,377,565, issued on Aug. 13, 2019, which is a national stage application of U.S. International Application No. PCT/US2015/030745, filed May 14, 2015, which claims the benefit of priority to U.S. Provisional Application No. 61/993,844, filed on May 15, 2014, entitled "ELECTRICALLY-POWERED WASTE ENCLOSURE", all of which are expressly incorporated herein by reference in their entirety.

BACKGROUND

1. Technical Field

The present disclosure relates to a waste enclosure device and more specifically to adapting electrically-powered waste enclosure device for waste collection functions and sensing operations.

2. Introduction

The collection of waste materials is an important function of every community. For example, proper collection of waste materials protects the environment, helps maintain the appearance of the community, and even helps minimize health risks from pollution. To this end, waste enclosures are ubiquitous devices in every community, with many devices strategically placed throughout numerous areas in the community to ensure that people have convenient access to a waste enclosure where they can dispose their trash, to prevent or minimize litter.

Part of a waste collection program also includes maintaining proper function and use of the waste enclosures. This can include ensuring that waste enclosures are emptied as they become full. Not surprisingly, as people use a particular waste enclosure with more frequency, the waste enclosure becomes full more quickly. Maintaining the use of the waste enclosure is accomplished by discarding contents once the waste enclosure is full. More trips to the location to discard the contents increases the cost of maintaining the use of waste enclosures. Yet if left full for a significant period of time, people are unable to use the waste enclosure to discard their trash until the waste enclosure is once again emptied, and as a result the benefits of the waste enclosure are greatly diminished. And as the number of waste enclosures in a community increase, it becomes more difficult to maintain each waste enclosure operational and empty the contents of each waste enclosure promptly as it becomes full.

To this end, it is advantageous to implement efficient operations for emptying the contents of full waste enclosures throughout the community. In addition, it is advantageous to implement technology features on waste enclosures to accurately and efficiently monitor and detect the fullness state of waste enclosures. Such technologies can complement sound operations for emptying contents to maximize results. Accordingly, there is a need for accurate and efficient waste enclosure technologies for monitoring and detecting contents and fullness state of waste enclosures.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to manage and control electrically-powered trash receptacles (i.e., enclosures) for collecting waste, and ensure accurate and efficient monitoring of content fullness levels are performed. Trash receptacles can be configured to monitor bin content fullness levels with one or more sensors. The trash receptacles can include a bin for storing items deposited in the trash receptacle. The bin can be fitted with a bag to hold the items in the bin, and allow a user to easily empty the contents by simply taking the bag off the bin and inserting a new bag. The one or more sensors can monitor the contents of the bag to determine the fullness levels of the bin. The bin and bag can also be fitted with a sleeve that prevents the bag from becoming puffed or otherwise move as puffiness or movement from the bag can otherwise cause a false detection of content fullness. The sleeve can have a complimentary shape to a top portion of the bin to keep the top portion of the bag properly in place next to the bin and not extended out into the bin or puffy and elevated. Thus, the sleeve can ensure that the sensing path is not improperly obstructed by the bag, resulting in more accurate sensing results and more efficient collection procedures.

Disclosed are systems, methods, and apparatuses for controlling electrically-powered trash receptacles and accurately monitoring fullness levels. A system can include a storage enclosure and a bin contained inside the storage enclosure. The bin can be configured to receive and store items deposited in the storage enclosure. Moreover an inside portion of the bin can be at least partially covered by a bag placed inside the bin to hold the items deposited in the storage enclosure. The system can also include a sensor configured to sense a contents fullness state of the bin, and a processor configured to control operations performed by the sensor. The processor can also be configured to control operations of other components in the storage enclosure, such as a transmitter, a receiver, other sensors, a battery, a camera, a display, a speaker, etc.

The system can also include a sleeve configured to be installed over an inside portion of the bin and over a portion of the bag. FIG. 8 illustrates an example sleeve. In some configurations, the sleeve can at least partially restrict movement of the bag inside the bin. Moreover, the sleeve can be configured to hold the bag inside the bin in a manner that ensures the bag remains within a distance of an inside bottom of the bin and away from a path of a sensing signal associated with the sensor to prevent a false fullness state detection by the sensor resulting from an upwards movement, of the bag inside the bin. For example, in some cases, the sensor can be located on an inside portion of the system above the bin, and can face the bin to detect the contents of the bin by sending a signal to the bin. Here, the bin can include a sleeve to prevent the bag on the bin from becoming "puffy" or moving upwards and extending into an inner area of the bin where trash is to be deposited and held, as the puffiness of the bag can trigger a false detection of fullness contents by, for example, decreasing the distance the signal travels before bouncing off an object, such as the puffy bag. Thus, the sleeve can restrict upwards or horizontal movement of the bag and ensure the path of the signal from the sensor is clear at least up to a distance above a bottom of the bin or a threshold distance from the length of the fully stretched bag. In some cases, the sleeve can even stretch the bag to remain open and lowered towards the bottom of the bin. The sleeve can prevent, as previously indicated, the bag from becoming lifted by air or other forces.

In some configurations, the sleeve encloses a portion of the bag inside the storage bin, which can include a portion from the top of the bin extending to down a portion of the length of the bin before reaching the bottom length of the bag. Moreover, the sleeve can have a top opening configured to be positioned at a top portion of the storage bin and a bottom opening facing a bottom portion of the storage bin. For example, the sleeve can be a hollow container shaped according to the bin and configured to be fitted inside the bin. Here, the hollow container can be configured to prevent the bag from becoming puffed by restricting the movement of the bag such that at least a portion of the bag is prevented from being lifted beyond a threshold distance above an inside bottom of the bin.

Furthermore, the sleeve can fit tightly around an inside portion of the bin in order to prevent movement of the sleeve inside the bin. The sleeve can also be complimentary to and be positioned at a top portion of the bin such that the sleeve sits on top of the bin or wraps around the bin, and extends down a portion of the inside length of the bin. Moreover, the sleeve can include handles to allow gripping and holding of the sleeve. Also, the bin can be made of plastic, rubber, metal, glass, fiberglass, cardboard, aluminum, or any other material capable of resisting a threshold level of force, such as an amount of wind force, or restrict a movement of the bag, such as by having a maximum level of flexibility and/or a certain amount of resilience.

The system can also include a battery for powering the sensor and the processor. In some embodiments, the system can also include a solar panel connected to the battery. The solar panel can be electrically connected to the battery. For example, the solar panel can be connected with a wire to the battery. Moreover, the system can also include one or more additional sensors, a display, an antenna, a receiver, a transmitter, one or more additional processors, etc. In some configurations, a transmitter in the system can be configured to communicate with a remote device, and the processor can be configured to control operations of the transmitter. The transmitter can be configured to send a warning message to the remote device or receive instructions, such as operating instructions and/or preferences, from the remote device. In some cases, the warning message can be based on a battery status and/or a fullness status of the bin, for example.

The system can also include a door on the storage enclosure for providing outside access to contents inside the storage enclosure. Here, the contents can include the bin, the sleeve, electrical components, items deposited in the storage enclosure, etc. In addition, the system can include a bracket system coupled to the storage enclosure. The bracket system can be configured to at least partially restrict movement of the bin and the sleeve, and prevent the bin and sleeve from being removed when the door is closed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure provides a way to control electrically-powered trash receptacles and accurately monitor fullness levels. A system, method and apparatus are disclosed which control electrically-powered trash receptacles and accurately monitor and sense fullness levels of the receptacles. A brief introductory description of a basic general purpose system or computing device in FIG. 1, which can be employed to practice the concepts, is disclosed herein. A more detailed description and variations of electrically-powered receptacles and mechanisms for monitoring and sensing fullness levels will then follow. These variations shall be described herein as the various embodiments are set forth. The disclosure now turns to FIG. 1.

Figure 1:
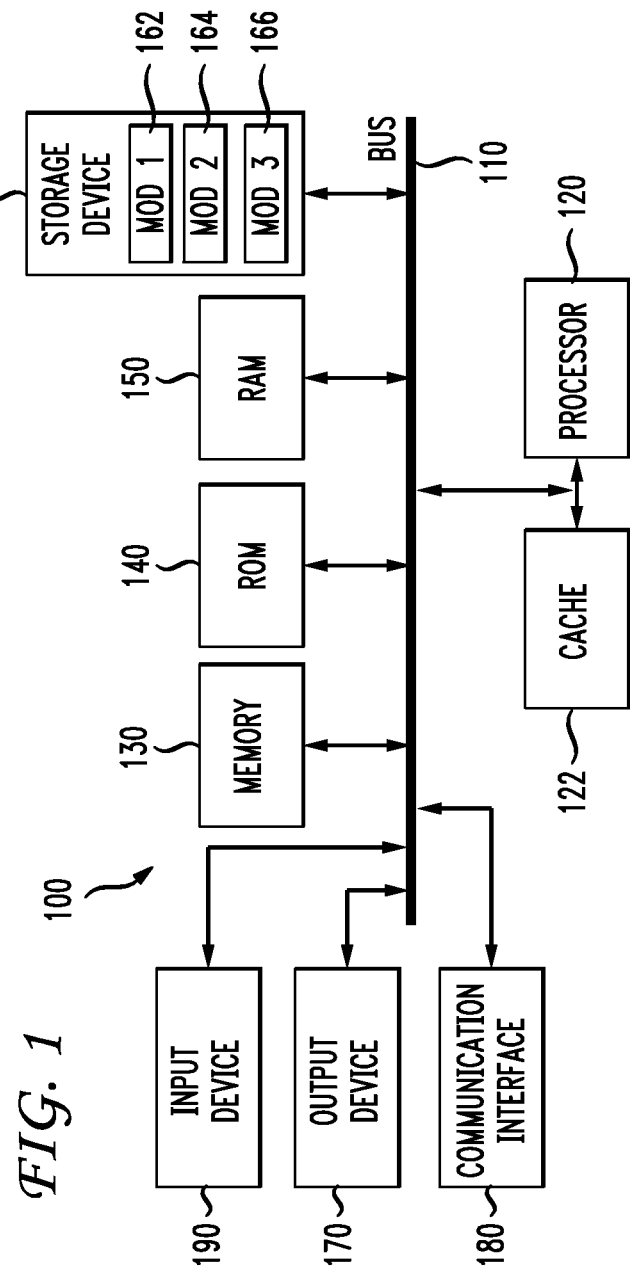
FIG. 1 illustrates an example system embodiment.

With reference to FIG. 1, an example system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the example embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the example operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
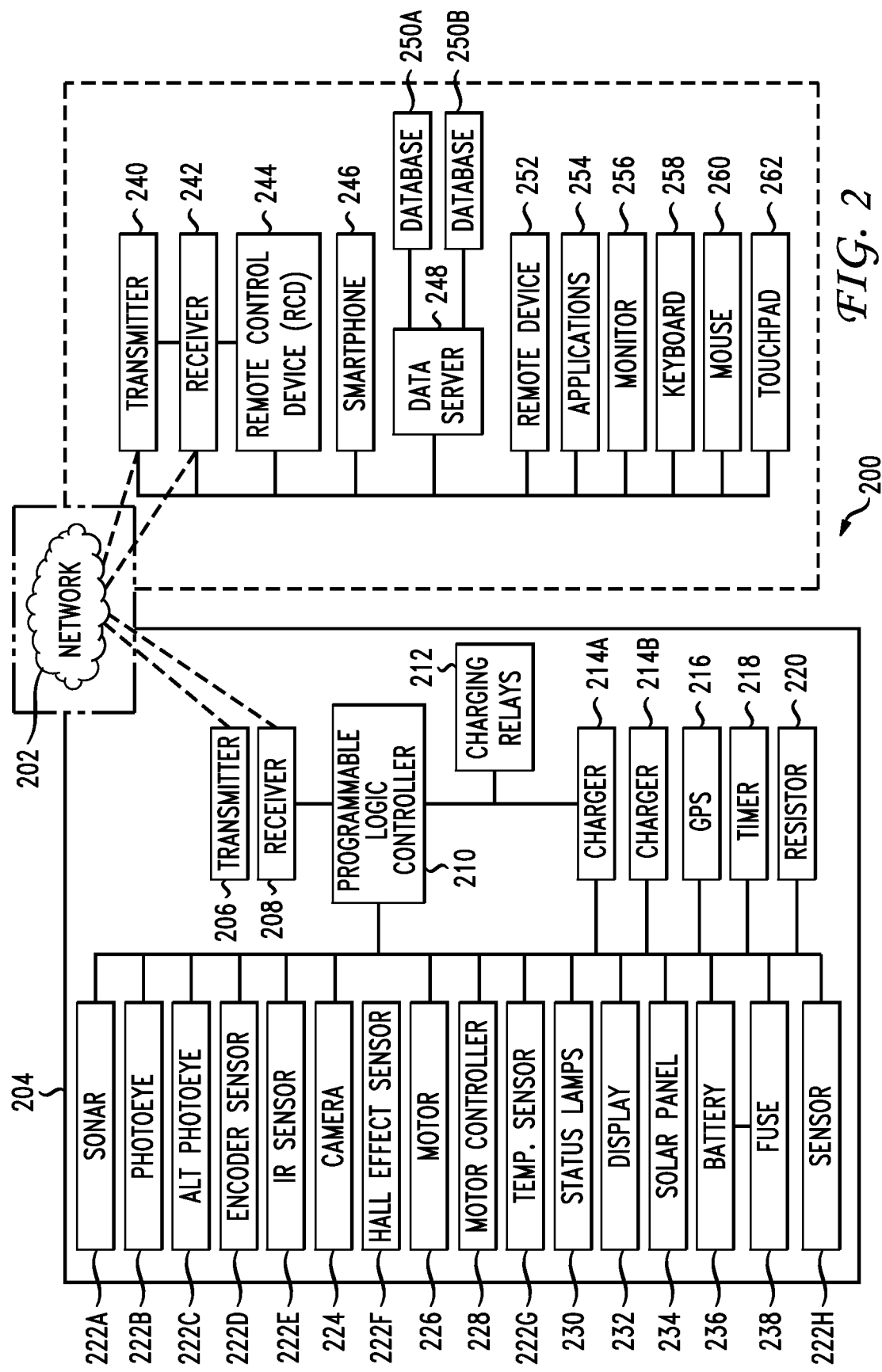
FIG. 2 illustrates an example architecture for remotely controlling electrically-powered enclosures.

Having disclosed some components of a computing system, the disclosure now turns to FIG. 2, which illustrates an example architecture for remotely controlling electrically-powered compactors. Receptacle 204 can be an electrically-powered receptacle for collecting waste, such as trash and recyclables, for example. Receptacle 204 can be, for example, a solar or battery-powered receptacle and/or compactor. Moreover, receptacle 204 can include a motor 226 for performing various operations, such as compaction operations. Further, receptacle 204 can be remotely controlled via remote control device (RCD) 244. To this end, receptacle 204 can include transmitter 206 and receiver 208 for communicating with RCD 244. In particular, transmitter 206 and receiver 208 can communicate with transmitter 240 and receiver 242 on RCD 244, and vice versa. Here, transmitters 206 and 240 can transmit information, and receivers 208 and 242 can receive information. This way, receptacle 204 and RCD 244 can be connected to transmit and receive information, such as instructions, commands, statistics, alerts, notifications, files, software, data, and so forth. Receptacle 204 can also communicate with other devices, such as a server and/or a collection vehicle, via transmitter 206 and receiver 208. Similarly, RCD 244 can communicate with other devices, such as a server and/or a user device 246, 252, via transmitter 240 and receiver 242.

Moreover, receptacle 204 and RCD 244 can communicate with each other and/or other devices via network 202. The network 202 can include a public network, such as the Internet, but can also include a private or quasi-private network, such as an intranet, a home network, a virtual private network (VPN), a shared collaboration network between separate entities, etc. Indeed, the network 202 can include many types of networks, such as local area networks (LANs), virtual LANs (VLANs), corporate networks, wide area networks, a cell phone transmitter and receiver, a WiFi network, a Bluetooth network, and virtually any other form of network.

Transmitter 206 and receiver 208 can be connected to printed circuit board (PCB) 210, which controls various functions on receptacle 204. In some embodiments, the RCD 244 can be incorporated within the PCB 210. In FIG. 2, the RCD 244 is electrically connected to the PCB 210 via transmitters 206, 240 and receivers 208, 242. The RCD 244 can be connected to transmitter 240 and receiver 242 via a two-way communication port, which includes transmitter 240 and receiver 242. The PCB 210 can control electrical functions performed by the receptacle 204. Electrical functions can include, for example, running compactions by actuating a motor 226; sensing waste or recyclables volume inside the receptacle 204 using a sensor at regular or programmable intervals, such as a sonar-based sensor 222A, a proximity sensor, and/or photoeye sensors 222B-C; changing status lamps 230 at regular and/or programmable thresholds to/from a color indicating that the receptacle 204 is not full (e.g., green), to/from a color indicating that the receptacle 204 is almost full (e.g., yellow), to/from a color indicating that the receptacle 204 is full (e.g., red); etc.

The RCD 244 can enable remote control and/or alteration of the functions performed or operated by the PCB 210. The RCD 244 can also provide access to, and control over, the various components 206, 208, 210, 212, 214A-B, 216, 218, 220, 222A-G, 224, 226, 228, 230, 232, 234, 236, 238 of the receptacle 204. Users can use a networked device, such as smartphone 246 and/or remote device 252, to communicate with the RCD 244 in order to manage and/or control the receptacle 204. For example, a user can communicate with the RCD 244 via the remote device 252 to change a threshold value on the PCB 210, which can control, for example, a collection timing; the compaction motor 226; the use of energy on a lighted advertising display, such as display 232; the status lamps 230; the sensors 222A-G; the camera 224; etc. The remote device 252 can include virtually any device with networking capabilities, such as a laptop, a portable media player, a tablet computer, a gaming system, a smartphone, a global positioning system (GPS), a smart television, a desktop, etc. In some embodiments, the remote device 252 can also be in other forms, such as a watch, imaging eyeglasses, an earpiece, etc.

The remote device 252 and RCD 204 can be configured to automatically modify the PCB's 210 operating parameters. However, users can also manually modify the PCB's 210 operating parameters via the remote device 252 and RCD 204. The operating parameters can be modified in response to, for example, evolving industry benchmarks; user inputs; historical data, such as the data gathered from a separate database 250A-B; forecasted data, such as upcoming weather characteristics; traffic conditions; a collection schedule; a collection route; a proximity of a collection vehicle; a time and/or date; a location; a capacity, such as a capacity of the receptacle 204 and/or a capacity of a collection vehicle; a fullness state of the receptacle 204; lapsed time between collections; lapsed time between compactions; usage conditions of the receptacle 204; energy usage; battery conditions; statistics; a policy; regulations; a detected movement of an object, such as an object inside or outside of the receptacle 204; collection trends; industry and/or geographical standards; zoning policies and characteristics; real-time information; user preferences; and other data. The data from the remote device 252 can be relayed to the RCD 244, and the data from the RCD 244 can be relayed, via the network 202, to the receptacle 204 and/or the remote device 252 for presentation to the user.

The user can control the RCD 244 and/or access and modify information on the RCD 244 via a user interface, such as a web page, an application 254, a monitor 256, and/or via voice messages and commands, text messages, etc. The remote device 252 can include a user interface, which can display, for example, graphs of collection statistics and trends (e.g., collection frequency, usage, temperature, etc.), collection reports, device settings, collection schedules, collection configurations, historical data, status information, collection policies, configuration options, device information, collection routes and information, alerts, etc. This way, users can access information to make educated decisions about how to set and/or reset operating parameters on the PCB 210; to control, for example, which sensors are used to gather data, which thresholds to set; to control outputs from the status lamps 230 and other components; etc. User can change settings on the receptacle 204, such as optimal collection timing, timing of sensor actuation; and/or modify parameters, such as desired capacity and fullness thresholds; using a scroll down menu, as shown in FIGS. 6-9 below, click-and-slide tools, interactive maps displayed on the remote device 252, touch screens, forms, icons, text entries, audio inputs, text inputs, etc. In response, the RCD 244 can automatically reconfigure the PCB 210 settings, recalibrate sensors and displays, change operating parameters, etc.

The RCD 244 can include a two-way communication port that includes transmitter 240 and receiver 242, which can wirelessly communicate with the PCB 210 of the receptacle 204, via the transmitter 206 and receiver 208 on the receptacle 204, which are connected electrically to the PCB 210. On scheduled and/or programmable intervals, the PCB's 210 transmitter 206 can send data to a central server, such as data server 248, via the network 202. Moreover, the RCD's 244 receiver 242 can be configured to query the data server 248, which can also be connected to the remote device 252, for incoming data. The data server 248 can communicate data from databases 250A-B. If there is no data to be received by the receiver 208, the PCB 210 can be configured to promptly return to a low-power mode, where the transmitter 206 and receiver 208 circuits are turned off, until another scheduled, received, initiated, and/or programmed communication event. If there is data to be received by the receiver 208, such as a command to turn the receptacle 204 off and then back on, a command to change the thresholds upon which compactions are operated, a command to change the thresholds for providing status updates and/or determining fullness states, etc., then the RCD receiver 242 can download the new data from the data server 248, via the RCD 244, to the PCB 210, altering its operating configuration. The RCD receiver 242 can also be configured to send data to the data server 248 to acknowledge the receipt of data from the PCB 210, and to send selected data to the remote device 252, the smartphone 246, and/or any other device, for presentation to a user.

The data server 248 can also display the data to a user on remote device 252, smartphone 246, or any other device. The data can be a password-protected web page, a display on the smartphone 246, a display on the monitor 256, etc. Remote control using the RCD 244 to reconfigure operating thresholds, sensor use, sensor hierarchy, energy usage, etc., can enable the receptacle 204 to alter characteristics that control its energy generation, energy consumption, and/or the collection and management logistics, further enabling sound operation of the receptacle 204.

The RCD 244 can be configured to communicate over a wireless network with the PCB 210, and transmit data to the data server 248, so the data can be stored for viewing and manipulation by a user via any web-connected computer, phone, or device. The RCD 244 can also be configured to receive data from the data server 248, and transmit the data back to the PCB 210. The PCB 210 can be electrically connected to a variety of sensors, such as sensors 222A-G, within the receptacle 204. Through the RCD 244, the PCB 210 can also be wirelessly connected to the databases 250A-B, and/or other external databases, such as a weather database, which may, for example, reside on a National Oceanographic and Atmospheric (NOAA) server, a database of trucks and locations and schedules, which may reside on a waste hauler's server, a database of traffic conditions, etc. A user can also change which of the sensors 222A-G are used in setting thresholds, among other things, in response to, for example, user commands and/or changes in outside data, such as weather data or truck location data.

The PCB 210 can also communicate with a temperature sensor 222G to gather temperature information, which can be transmitted to the RCD 244 via the PCB transmitter 206. The temperature information can be used, among other things, to fine tune operational functions and energy consumption of the receptacle 204. For example, the PCB 210 can be reconfigured to run less compaction per day, such as four to eight compactions, in cold weather, since batteries are less powerful in cold weather. Coinciding with cold weather, the winter days are shorter, thus solar energy and battery power is limited. In order to conserve power on low-sunlight days, the RCD 244 can adjust the PCB's 210 normal fullness sensitivity levels, so that collections are prompted to be made earlier. For example, if the PCB 210 typically runs 20 compactions before changing status lamps from green to yellow, a signal that suggests optimal collection time, the RCD 244 can adjust the thresholds of the PCB 210 to run 10 compactions before changing from a green state to a yellow state, thus changing the total energy consumption of the compactor between collections. In a busy location, the PCB 210 can be configured to sense receptacle fullness every minute, whereas in a less busy location, the PCB 210 can be configured to sense fullness once a day.

In some embodiments, the RCD 244 can also alter the timing of events using algorithms based on the results of historical events. For example, the RCD 244 can be initially configured to sense fullness once per minute, but based on resulting readings, it can then alter the timing of future readings. Thus, if three consecutive readings taken at one-minute intervals yield a result of no trash accumulation, the RCD 244 can increase the timing between readings to two minutes, then three minutes, etc., based on the various readings. The RCD 244 can also be configured to adjust sensing intervals based on the level of fullness of the receptacle 204, so it would sense more frequently as the receptacle 204 fills, in order to reduce the margin of error at a critical time, before the receptacle 204 overflows. This "learning feature" can save energy by ultimately synchronizing the sensor readings with actual need to sense. The RCD 244 can also alter thresholds of status lamps 230 based on collection history, the need for capacity as determined by the frequency of red or yellow lights on the receptacle 204, temperatures, expected weather and light conditions, expected usage conditions, etc. The status lamps 230 can be LED lights, for example.

In FIG. 2, the RCD 244 can be enabled, via the PCB 210, to read, for example, a temperature sensor 222G; an encoder sensor 222D, which can measure movement of a compaction ram by utilizing an "encoder wheel" which is mounted on a motor shaft; one or more photoeye sensors 222B-C; door sensors; a sensor which measures current from the solar panel and a sensor which can measure current from the battery 236 to the motor 226; a hall effect sensor 222F, which can detect movement of, for example, a door; an infrared (IR) sensor 222E, a camera 224, etc. In addition, the thresholds set by the RCD 244 can be based on historical and real-time information, user preferences, industry norms, weather patterns and forecasts, and other information. The RCD 244 can reset the PCB's 210 normal thresholds hourly, daily, weekly, monthly, yearly, or at adjustable intervals, based on a variety of information and user decisions.

The RCD 244 can also alter the PCB's 210 normal hierarchy of sensor usage. For example, if the PCB 210 is configured to run a compaction cycle when one or more of the photoeyes 222B-C located inside the receptacle 204 are blocked, the RCD 244 can reconfigure the sensor hierarchy by reconfiguring the PCB 210 to run compaction cycles after a certain amount of time has passed, by reading the position of the encoder sensor 222D at the end of a cycle, by reading one or more photoeye sensors 222B-C, by calculating a sensor hierarchy based on historical filling rates, by a change in user preferences, etc. Using an aggregate of data from other receptacles located worldwide in a variety of settings, the RCD's 244 configurations can depend on constantly evolving parameters for optimizing energy utilization, capacity optimization, and operational behavior, among other things. The RCD 244 innovation and growing database of benchmarks, best practices and solutions to inefficiency, enables the receptacle 204 to adapt and evolve.

Based on the data from the PCB 210, the sensors, inputs by the users (e.g., the customer or the manufacturer) via the RCD 244, and/or based on other data, such as historical or weather data, the RCD 244 can change the PCB 210 thresholds, operational parameters, and/or configuration, to improve the performance of the receptacle 204 in different geographies or seasons, or based on different user characteristics or changing parameters. Thus, the system and architecture can be self-healing.

The RCD 244 can also be configured to change the PCB's 210 normal operating parameters. For example, the RCD 244 can be configured to cause the PCB 210 to run multiple compaction cycles in a row, to run energy through a resistor 220 to apply a strong load upon the battery 236, which can supply the energy. The RCD 244 can measure battery voltage at predetermined or programmable intervals, to measure the "rebound" of the battery 236. A strong battery will gain voltage quickly (e.g., the battery will almost fully recover within 15 minutes or so). A weak battery will drop significantly in voltage (e.g., 3-5 volts), will recover slowly, or will not recover to a substantial portion of its original voltage. By changing the normal parameters of the PCB 210, the battery 236 can be subjected to a heavy load during a test period, which will determine the battery's strength without jeopardizing operations. The RCD 244 can then be configured to relay a message to the user that a battery is needed, or to use the battery differently, for example, by spacing out compactions in time, reducing the degree of voltage decline within a certain time period, etc. The RCD 244 can also alter the PCB 210 to do more compactions or other energy-using functions (like downloading software) during the daytime, when solar energy is available to replenish the battery 236 as it uses energy. Moreover, the user can then order a new battery by simply clicking on a button on a web page, for example.

Since the RCD 244 can be connected to databases, and can be informed by the PCB 210 on each receptacle, the RCD 244 can also be used to relay data for other types of servicing events. For example, the RCD 244 can be configured to relay a message to a waste hauler to collect the receptacle 204 if two or more parameters are met simultaneously. To illustrate, the RCD 244 can relay a message to a waste hauler to collect the receptacle 204 if the receptacle 204 is over 70% full and a collection truck is within 1 mile of the receptacle 204. The RCD 244 can then send a message to the remote device 252 to alert a user that a collection had been made, and the cost of the collection will be billed to the user's account.

In addition, the RCD 244 can change the circuitry between the solar panel 234 and the battery 236, so that solar strength can be measured and an optimal charging configuration can be selected. The charging circuitry 214A-B is illustrated as two circuitries; however, one of ordinary skill in the art will readily recognize that some embodiments can include more or less circuitries. Charging circuits 214A-B can be designed to be optimized for low light or bright light, and can be switched by the RCD 244 based on programmable or pre-determined thresholds. Also, while solar information can be readily available (e.g., Farmers' Almanac), solar energy at a particular location can vary widely based on the characteristics of the site. For example, light will be weaker if reflected off a black building, and if the building is tall, blocking refracted light. For this reason, it can be useful to measure solar energy on site, as it can be an accurate determinant of actual energy availability at a particular location. To do this, the battery 236 and solar panel 234 can be decoupled using one or more charging relays 212. In other aspects, a very high load can be placed on the battery 236 to diminish its voltage, so that all available current from the solar panel 234 flows through a measureable point. This can be done, for example, by causing the receptacle 204 to run compaction cycles, or by routing electricity through a resistor, or both.

There are a variety of other methods which can be used to create a load. However, putting a load on the battery 236 can cause permanent damage. Thus, the RCD 244 can also be configured to disconnect the battery 236 from the solar panel 234, instead routing electricity through a resistor 220. This can allow for an accurate measurement of solar intensity at a particular location, without depleting the battery 236, which can help assess the potential for running compactions, communicating, powering illuminated advertisements, and powering other operations. In some embodiments, the PCB 210 can be reconfigured by the RCD 244 to run continuous compaction cycles for a period of time, measure solar panel charging current, relay the data, and then resume normal operations. Different configurations or combinations of circuits can be used to test solar intensity, battery state or lifecycle, and/or predict solar or battery conditions in the future.

The RCD 244 can also track voltage or light conditions for a period of days, and alter the state of load and charging based on constantly changing input data. For example, the RCD 244 can configure the timer 218 of the PCB 210 to turn on the display 232 for advertising for a number of days in a row, starting at a specific time and ending at another specific time. However, if the battery voltage declines over this period of time, the RCD 244 can then reduce the time of the load (the display 232) to every other day, and/or may shorten the time period of the load each day. Further, the RCD 244 can collect information on usage and weather patterns and reconfigure the PCB's 210 normal operating regimen to increase or reduce the load (for example, the advertisement on the display 232) placed on the battery 236, based on the information collected. For example, if it is a Saturday, and expected to be a busy shopping day, the RCD 244 can allow a declining state of the battery 236, and can schedule a period on the near future where a smaller load will be placed on the battery 236, by, for example, not running the advertising on the coming Monday. In doing so, the RCD 244 can optimize the advertising value and energy availability to use energy when it is most valuable, and recharge (use less energy) when it is less valuable. In order to maximize solar energy gained from a variety of locations, the RCD 244 can cause the PCB 210 to select between one of several charging circuits. For example, if it is anticipated that cloudy conditions are imminent, the RCD 244 can change the circuit that is used for battery charging, in order to make the charger more sensitive to lower light conditions. In a sunny environment, the charger circuit used can be one with poor low-light sensitivity, which would yield more wattage in direct sunlight.

The architecture 200 can also be used for monitoring functions, which can enable users to access information about the receptacle 204 and collection process. With this information, users can make judgments that facilitate their decision-making, helping them remotely adjust settings on the receptacle 204 to improve performance and communication. For example, the RCD 244 can be configured to enable users to easily adjust callback time, which is the normal time interval for communication that is configured in the PCB 210. The RCD 244 can enable the user to alter this time setting, so that the receptacle 204 communicates at shorter or longer intervals. Once the PCB 210 initiates communication, other parameters can be reconfigured, such as awake time, which is the amount of time the receiver is in receiving mode. This enables users to make "on the fly" changes. In some cases, the PCB 210 can shut down after sending a message and listening for messages to be received. In these cases, it can be difficult to send instructions, wait for a response, send more instructions and wait for response, because the time lapse between normal communications can be a full day. However, by remotely adjusting the setting through the RCD 244, the user can make continuous adjustments while testing out the downloaded parameters in real time, and/or close to real time. This can enhance the ability of the user to remotely control the receptacle 204.

Further, the RCD 244 can alter the current of the photoeyes 222B-C, in a test to determine whether there is dirt or grime covering the lens. Here, the RCD 244 can reconfigure the normal operating current of the photoeyes 222B-C. If the lens is dirty, the signal emitter photoeye will send and the signal receiver will receive a signal on high power, but not on low power. In this way, a service call can be avoided or delayed by changing the normal operating current to the photoeyes 222B-C. This can be a useful diagnostic tool.

In some embodiments, regular maintenance intervals can be scheduled, but can also be altered via information from the RCD 244. The RCD 244 can be configured to run a cycle while testing motor current. If motor current deviates from a normal range (i.e., 2 amps or so), then a maintenance technician can be scheduled earlier than normal. The RCD 244 can send a message to the user by posting an alert on the users web page associated with the receptacle 204.

Other settings can be embodied in the receptacle 204 as well. For example, the PCB 210 can sense that the receptacle 204 is full. The RCD 244 can then configure the PCB 210 to have a web page, or another display, present a full signal. The RCD 244 can alter when the full signal should be presented to the user. For example, after accessing a database with historical collection intervals, the RCD 244 can reconfigure the PCB 210 to wait for a period of time, e.g., one hour, before displaying a full signal at the web page. This can be helpful because, in some cases, a "false positive" full signal can be signaled by the PCB 210, but this can be avoided based on historical information that indicates that a collection only a few minutes after the last collection would be highly aberrational. The RCD 244 can thus be configured to override data from the PCB 210. Instead of sending a full signal to the user, the RCD 244 reconfigures the PCB 210 to ignore the full signal temporarily, and delay the display of a full-signal on the users' web page or smart phone, in order for time to go by and additional information to be gathered about the receptacle's actual fullness status. For example, when a collection is made and ten minutes later, the fullness sensor detects the receptacle 204 is full, the fullness display message on the web page can be prevented from displaying a full status. In some cases, the bag can be full of air, causing the proximity sensor in the receptacle 204 to detect a full bin. Within a certain time period, e.g., twenty minutes in a busy location, a few hours in a less busy location, as determined based on the historical waste generation rate at the site, the bag can lose its air, and the proximity sensor can sense that the bin is less full than it was twenty minutes prior, which would not be the case if the bin was full with trash instead of air. Thus, "false positive" information can be filtered out.

Likewise, tests and checks can be performed so that false negative information is avoided as well. For example, if a bin regularly fills up daily, and there is no message that it is full after two or three days, an alert can appear on the users' web page indicating an aberration. Thresholds for normal operating parameters and adjustments to normal can be set or reset using the RCD 244, or they can be programmed to evolve through pattern recognition. Although many operating parameter adjustments can be made through the web portal, adjustments can also be made automatically. This can be controlled by a software program that aggregates data and uses patterns in an aggregate of enclosures to alter PCB 210 settings on a single enclosure. For example, if the collection data from 1,000 enclosures indicates that collection personnel collect from bins too early 50% of the time when compaction threshold setting is set to "high", compared to 10% of the time when compaction settings are set at "medium," then the RCD 244 can reprogram the compaction thresholds to the medium setting automatically, so that collection personnel can be managed better, limiting the amount of enclosures that are collected prematurely. Automatic reprogramming, governed by software programs, can be applied to other aspects, such as user response to dynamic elements of the receptacle 204, such as lighted or interactive advertising media displayed on the receptacle 204. For example, if users respond to an LCD-displayed advertisement shown on the receptacle 204 for "discounted local coffee" 80% of the time, the RCD 244 can configure all receptacles within a certain distance, from participating coffee shops, to display the message: "discounted local coffee."

In some embodiments, the RCD 244 can include a data receiving portal for the user with information displays about an aggregate of receptacles. Here, the user can access real-time and historical information of, for example, receptacles on a route, and/or receptacles in a given geography. The data can be displayed for the user on a password-protected web page associated with the aggregate of receptacles within a user group. The receptacle 204 can also display, for example, bin fullness, collections made, the time of collections, battery voltage, motor current, number and time of compaction cycles run, graphs and charts, lists and maps, etc. This data can be viewed in different segments of time and geography in order to assess receptacle and/or fleet status, usage, and/or trends. The users' web page can show, for example, a pie chart showing percentage of bins collected when their LED was blinking yellow, red and green, or a histogram showing these percentages as a function of time. These statistics can be categorized using pull down menus and single-click features. A single click map feature, for example, is where summary data for a particular receptacle is displayed after the user clicks on a dot displayed on a map which represents that receptacle. This can allow the user to easily view and interact with a visual map in an external application.

The RCD 244 can be configured to display calculated data, such as "collection efficiency," which is a comparison of collections made to collections required, as measured by the utilized capacity of the receptacle 204 divided by the total capacity of the receptacle 204 (Collection Efficiency=utilized capacity/total capacity). The user can use this information to increase or decrease collections, increase or decrease the aggregate capacity across an area, etc. Typically, the users' goal is to collect the receptacle 204 when it is full—not before or after. The user can click buttons on their web page to show historical trends, such as collection efficiency over time, vehicle costs, a comparison of vehicle usage in one time period versus vehicle usage in another time period, diversion rates, a comparison of material quantity deposited in a recycling bin versus the quantity of material deposited into a trash bin. Other statistics can be automatically generated and can include carbon dioxide emissions from trucks, which can be highly correlated to vehicle usage. Labor hours can also be highly correlated with vehicle usage, so the web page can display a labor cost statistic automatically using information generated from the vehicle usage monitor. As the user clicks on buttons or otherwise makes commands in their web portal, the RCD 244 can change the PCB's 210 operating parameters, usage of sensors, etc., and/or measurement thresholds in response. The RCD 244 can also be configured to automatically display suggested alterations to the fleet, such as suggestions to move receptacles to a new position, to increase or decrease the quantity of receptacles in a given area, to recommend a new size receptacle based on its programmed thresholds, resulting in an improvement in costs to service the fleet of receptacles.

Heat mapping can also be used to provide a graphical representation of data for a user. Heat mapping can show the user the level of capacity in each part of an area, for example a city block, or it can be used to show collection frequency in an area. In each case, the heat map can be generated by associating different colors with different values of data in a cross sectional, comparative data set, including data from a plurality of enclosures. The heat map can be a graphical representation of comparative data sets. In some embodiments, red can be associated with a high number of a given characteristic, and "cooler" colors, like orange, yellow and blue, can be used to depict areas with less of a given characteristic. For example, a heat map showing collection frequency or compaction frequency across 500 receptors can be useful to determine areas where capacity is lacking in the aggregate of enclosures—a relative measure of capacity. In this case, the highest frequency receptacle can assigned a value of red. Each number can be assigned progressively cooler colors. In other embodiments, the red value can be associated with a deviation from the average or median, for example, a darker red for each standard deviation. The heat maps can be shown as a visual aid on the user's web page, and can color-code regions where "bottlenecks" restrict vehicle and labor efficiency. A small red region can show graphically, for example, that if the user were to replace only ten receptacles with higher-capacity compactors, the collection frequency to a larger area could be reduced, saving travel time. Heat maps can be a helpful visual tool for showing data including, but not limited to, data showing "most collections" in a given time period, "most green collections," which can visually demonstrate the number of bins collected too early (before they are actually full), "most compactions," which can show on a more granular level the usage level of the bin, "most uses," which can represent how many times the insertion door of the bin is opened or utilized, "most alerts," which can show visually the number of "door open alerts," which can show when doors were not closed properly, "voltage alerts," which can show visually which receptacles are of low power, etc. While specific measurements are described herein to demonstrate the usefulness of heat mapping, there are other sets of data that can be represented by the heat maps, which are within the scope and spirit of this invention.

The RCD 244 can also be used for dynamic vehicle routing and compaction and/or receptacle management. Because the RCD 244 can be a two-way communicator, it can both send and receive information between various receptacles and databases. This can allow the user to cross-correlate data between the fleet of receptacles and the fleet of collection vehicles. The RCD 244 can receive data from the user and/or the user's vehicle. For example, the RCD 244 can receive GPS data or availability data, and use it to change parameters on a given receptacle or aggregate of receptacles. The RCD 244 can receive this data from the users' GPS-enabled smartphone, for example. Similarly, the RCD 244 can send data to the user, a user device, a smartphone, etc., about the status of the receptacle 204. With this two-way data stream, collection optimization can be calculated in real time or close to real time. For example, a collection truck is traveling to the east side of a city and has 30 minutes of spare time. The RCD 244 can receive information about the truck's whereabouts, availability and direction, and query a database for receptacle real time and historical fullness information and determine that the truck can accommodate collections of twenty receptacle locations. The RCD 244 can then display a list of twenty receptacle locations that the truck can accommodate. The user can view a map of the twenty recommended locations, see a list of driving directions, etc. The map of driving directions can be optimized by adding other input data, such as traffic lights, traffic conditions, average speed along each route, etc. At the same time, as the truck heads to the east side of the city, the RCD 244 can reconfigure receptacles on the west side to change compaction thresholds, so that capacity is temporarily increased, freeing up additional time for the truck to spend in the east section. Alternatively, the RCD 244 can reconfigure a receptacle to temporarily display a "full" message to pedestrians, helping them find a nearby receptacle with capacity remaining. The RCD 244 can, in the case where the receptacle requires payment, increase pricing to the almost-full receptacle, reducing demand by pedestrians or other users. This same logic can be effective in situations where trucks are not used, for example, indoors at a mall or airport. The demand for waste capacity can vary, so having remote control over the receptacle 204 can allow users to change settings, parameters, and/or prices to make the collection of waste dynamic and efficient.

The location of the receptacle 204 and other receptacles can be determined via triangulation and/or GPS, for example, and placed on a map in the interactive mapping features. Moreover, the location of an indoor receptacle can be obtained from indoor WiFi hot spots, and the indoor receptacle can be placed on a map in the interactive mapping features. As a staff member accomplishes tasks (i.e., cleaning a bathroom) and moves inside a facility, the staff member's location can be tracked, and the fullness and location of nearby receptacles can be plotted on a map or given to the staff member by other means, as instructions to add a collection activity to the list of tasks. Whether by GPS, Wifi, Bluetooth, etc., triangulation between communication nodes can serve to locate a receptacle on a map, and measurements of fullness of receptacles can be used to create work instructions for staff members or truck drivers, so that efficient routes and schedules can be created to save time.

To better manage the collection process, user groups can be separated between trash and recycling personnel. In many cities, there are separate trucks used to collect separate streams of waste, such as trash and recyclables. For this reason, it can be helpful to configure the user's web page to display data based on a waste stream. The data can also be divided in this fashion and displayed differently on a smartphone, hand-held computer, and/or other user device. In addition, data can be displayed differently to different users. For example, the manager of an operation can have "administrative privileges," and thus can change the location of a particular receptacle in the system, view collection efficiency of a particular waste collector, view login history, and/or view industry or subgroup benchmarks, while a waste collector with lower privileges can only view receptacle fullness, for example. The RCD 244 or another device can also be configured to print a list of receptacles to collect next, a list of full or partially full bins, etc. For example, the remote device 252 can be configured to print a list of receptacles to collect in the remaining portion of a route.

Figure 3:
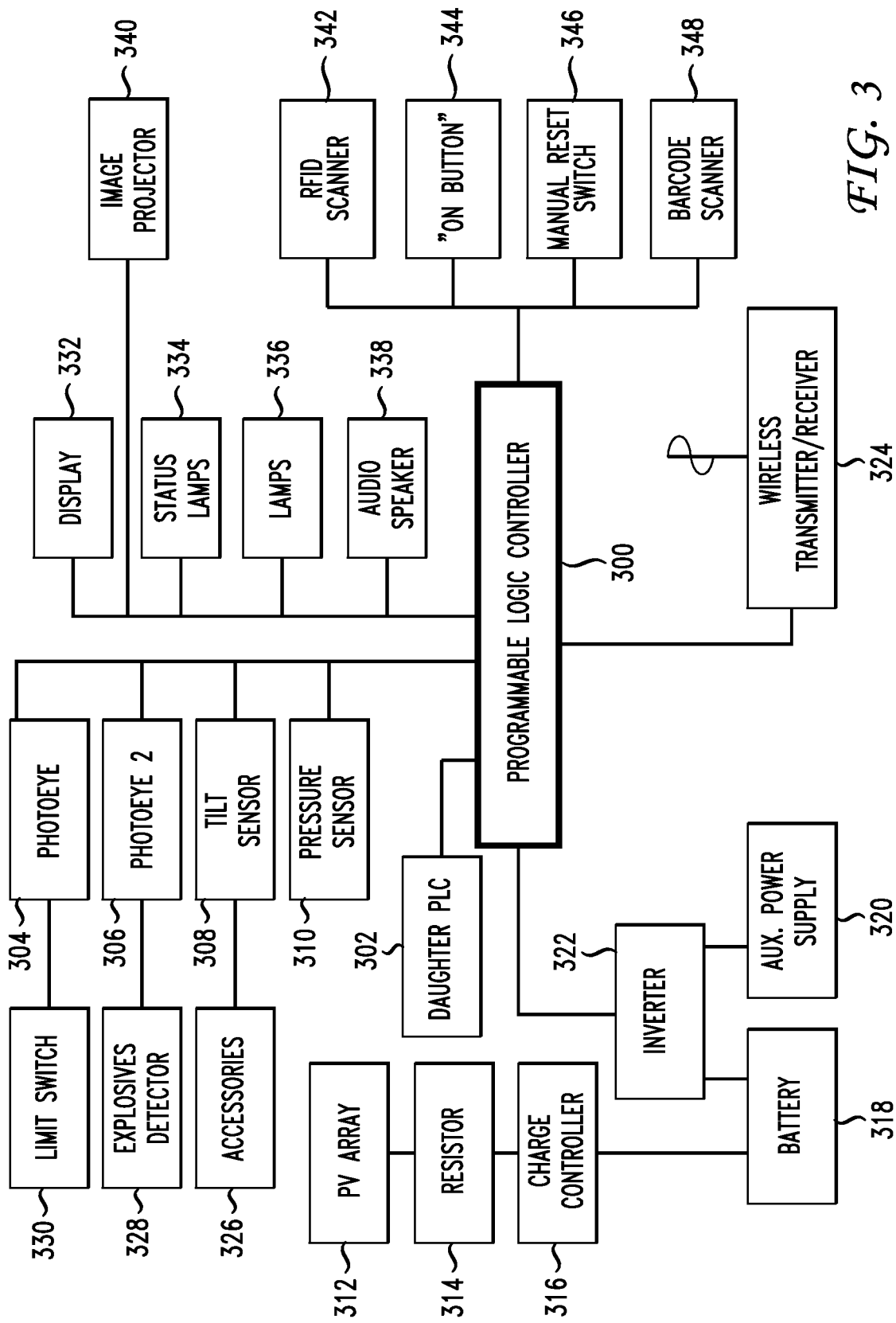
FIG. 3 illustrates a schematic of an example enclosure with augmented functions.

FIG. 3 illustrates a schematic of an example enclosure with augmented functions. The programmable logic controller 300 can be a central microprocessor, which is capable of managing and controlling operations, detecting inputs, and providing outputs for running the device. It is also capable of controlling power to the photo eyes/proximity sensors 304 and 306, by relays or contactors, or other switching means. In different embodiments, photo eyes can be used in place of limit switches or vice versa, without changing the nature of the present invention. A tilt-sensor 308 can be located above the bin or waste material chamber (not shown), and actuated when, for example, the device is vandalized or tipped by a car or accident. Photo eyes/proximity sensors 304 and 306 can be turned on when PLC 300 senses that the insert opening has been used, or when the On Button 344 in switch panel 346 has been pressed or when the scanner 342, 348 is engaged, or when the receiver 324 senses the presence of a handheld computer configured to communicate data with the PLC 300. Activation can be programmed to save energy when no materials are present, and reduce energy consumed by sensing objects unnecessarily. When turned on, in one embodiment, the photo eyes 304, 306 and/or limit switch sensors 330 can determine whether materials block the light rays or signals between this photo-eye sensor and a reflector on the opposite side of the channel above the bin or when the limit switches 330 are pressed. The photo-eyes can signal the programmable logic controller (PLC) 300 when waste blocks the light beam for a measured amount of time, indicating that a particular quantity of waste is present. When sufficient waste is present, a message can be sent by the wireless transmitter/receiver 324 connected to the PLC 300. Other sensors can also be used to detect the number of uses of the insertion opening (not shown) or the scanners 342, 348.

Pressure sensors 310 can be used along with, or instead of, photo eye sensors, and alternatively used to sense waste presence, absence, or inventory (i.e., fullness) levels. Moreover, an internal proximity sensor 306 can be used to detect waste. Further, as previously indicated, tilt Sensor 308 can transmit a message to PLC 300 if the device has been vandalized, stolen, or tipped over. Display 332 can be used to display messages to users. Image projector 340 can be turned on when users are in the vicinity of the device, as detected by an external proximity sensor, for example. The PLC can intermittently connect the proximity sensor to the power source to sense nearby users at regular intervals. For example, the proximity sensor can be turned on for 0.5 seconds every five seconds. This would reduce power consumption to the proximity sensor by a factor of ten, compared to continuous sensing. Of course, other intervals are also contemplated. The images shown by the projector 340 or display 332 can be transmitted to the PLC 300 from the wireless transmitter/receiver 324 or programmed into the PLC 300 manually by service personnel.

Information can be collected via RFID, barcode, tags, images, etc. For collecting information, the device can use scanners 342, 348. In some embodiments, the scanner 342 can be an RFID scanner and scanner 348 can be a barcode scanner. In other embodiments, the device can include other types of scanners, such as an image scanner, for example.

Status Indicators 334 and lamps 336 can be also used to convey messages, including but not limited to "on," "low battery," "collected," and "broken" notifications. Also, an Audio Speaker 338 can be used to convey audio messages. Programming the PLC 300 can enable audio levels to be controlled by staff on site or remotely via the transmitter 324. In some cases, when PLC 300 is not being used, it can be put to "sleep," a low energy mode, and reengaged by a Daughter PLC 302 that responds to inputs. When in operating mode, the PLC 300 can use more energy than in "sleep mode."

Solar panel 312 can be connected to a charge controller 316, which controls charging to the battery 318. Resistor 314 can be placed between the positive lead of the solar panel 312 and the positive lead of the charger. An inverter 322 can be connected to the battery 318 to provide auxiliary power through a supply port 320 or power to AC devices. Further, a manual reset switch 346 can be connected to the PLC 300. The manual reset can be actuated remotely through the use of the transmitter 324.

In some embodiments, the projected solar panel output can be 30-Watts Peak, and the solar panel 312 can generate up to about 90 Watt-hours of energy per day, given an average of 3 hours of full sunlight available per day. Sunlight energy can be collected by the solar panel 312 and converted by the charge controller 316 into a battery charging current and voltage. Battery reserve can be approximately 800 Watt-hours and, in some cases, each data transmission may use approximately $\frac{1}{5}^{th}$ Watt-hours. Thus, the energy reserve in this example can be enough to run up to 4,000 message transmission cycles. When large data sets are transmitted, such as when a graphic or photograph is downloaded to the device, fewer data transmissions may be possible. Therefore, the PLC 300 can adjust energy usage to match energy generation and energy storage over time by reducing the frequency of un-prioritized operations. Optionally, in some situations, instead of charging from the solar panel 312, batteries can be charged off-site and swapped into the device as needed. In these instances, slightly larger batteries than described above can be used. The controller 300 can be programmed to permit data transmission cycles, audio and other functions and lighting such that downtime and battery over-discharge and thus battery damage can be avoided. The controller 300 can also be programmed to sense a battery losing capacity and send a data transmission to personnel before the battery loses all power in advance of failure.

When in charging mode, the PLC 300 can include a maximum power tracker, regulating the charging of the battery from the solar panel 312. The power tracker can have the ability to vary the level of voltage and amperage based on the characteristics of the solar panel 312, the sunlight level and the battery 318 condition. The power tracker can have the ability to balance current and voltage inputs to optimize battery 318 charging. The PLC 300 can have the ability to optimize the charging regimen of the battery 318 by tracking the level of photovoltaic energy available and the battery charge and use of the device. When the battery 318 is fully discharged, the controller 300 can output low voltage and high amperage. When the battery 318 is almost completely charged, the controller 300 can output a higher voltage and lower current. When the battery 318 is fully charged, the controller 300 may not output any charge to the battery 318, or may simply output a trickle charge. In addition, the controller 300 can be configured to output higher voltage when temperatures are low, and lower voltage when in hot weather. Thus, the battery 318 can avoid being over-discharged when it is cold and more susceptible to failure and damage. A temperature sensor (not shown) can inform the PLC 300, which is programmed to regulate charge current according to temperature-controlled thresholds. The PLC 300 may also control lighting and the frequency of operations of ancillary components based on temperature data. In some cases, the nominal 12 Volt battery can be maintained at 13-14 Volts in cold weather (i.e., about 10 to 40° F.; −12 to 5° C.), and 12V-12.5 Volts in hotter weather (i.e., about 80 to 90° F., 27-32° C.). Conversely, when the battery 318 is undercharged, the controller 300 can delay or skip a data logging or transmission event or limit lighting or audio levels until adequate charge is attained or until a new battery is installed. This serves to extend battery life and avert battery or operational failure.

This PLC 300 directed duty cycle can be determined by low power timing circuitry contained in a section of the PLC 300, or in the "daughter PLC" 302. Such circuitry can govern the rate of energy usage by the ancillary components by turning components on, off or initiating low-power modes at regular intervals. The circuitry regularly initiates functions carried out by the ancillary components, and the time lag between functions can be programmed in the PLC 300 to adjust to battery voltage levels, or can be modifiable on the unit, or programmable by means of a wireless communication device or by electrical connection between the programming device (i.e., computer) and the PLC 300, or by configuring the PLC 300 to adjust power levels automatically based on environmental information, such as temperature, light levels, or noise levels. In some embodiments, the controller 300 can include data logging to gather usage history for analysis or transmission.

Certain embodiments may include additional controlling components. For example, a secondary controlling component, herein shown schematically as Daughter PLC 302, can be programmed to reduce or increase the clock speed (processor speed) of the primary processor to save energy. Logic of the controlling component can slow the clock speed when no functions are being run. During a period of high use, the clock speed of the PLC 300 can be increased so that data transmission or sensor monitoring occurs quickly and accurately. Failure to slow clock speed of the PLC 300 after high-energy use can result in wasted energy, and failure to increase clock speed can result in waste streams being missed or miscounted, or data transmission time lengthened thus increasing airtime costs and transmitter energy use. A microcontroller, such as a PIC processor, can also be used in conjunction with PLC 300. As noted, a Daughter PLC 302 can be configured to increase the clock speed of the main PLC 300. The Daughter PLC 302 can be configured to speed up the primary processor when it receives a signal that the system is being used from Scanner 342, from transmitter 324, from the insertion opening sensor, or by other sensors that indicate system usage. Alternately, the Daughter PLC 302 can activate the primary PLC 300 when it senses a potential user is nearby. In this case, the external proximity sensor can sense a proximity of a passerby. During data transmission and sensor activation, a typical PLC processor can operate at approximately 4 MHz. Otherwise it can operate at approximately 32 KHz. Of course, other clock speeds are also contemplated.

Other components that may be turned on for only limited periods are sensors, such as pressure sensor 310 and scanners 342, 348, which, in some cases, may be on as needed to gather data. Certain sensors, such as photo eye/proximity sensor, can be turned on for minimum periods, for example up to 0.05 seconds, to respond reliably to the input signal while not consuming more energy than needed. This saves energy because the sensors consume energy only when they are on, provided that their normal state is off. Also, most data gathering events can be processed quickly, so very low duty cycles can be achieved with this innovation. Logs may be stored in hard drive memory and sent by the wireless transmitter 324 to staff. These logs may be uploaded wirelessly to a central server so status information to users via cell phone or email or SMS (text message) can be relayed.

Another point of energy saving control is an insertion-opening sensor configured to engage photo-eye sensor 304 or scanners 342, 348 when pressure sensor 310 responds to waste as deposited, rather than checking at intervals, or continuously, or on another basis. The PLC 300 can be programmed to trigger photo eye sensor 304 and scanner 342 after insertion-opening has been opened or pressure sensor activated. Here, a transducer, such as an inductive sensor or pressure transducer or Hall Effect sensor, located on insertion opening, can allow for a signal to be sent to the controlling component indicating each usage.

In a specific embodiment, the controlling component is programmed to shut down unused circuits within PLC 300 or other circuits when any are unneeded. Specifically, the controlling component is programmed to disable certain sections of the circuit board, thereby turning off electricity to the waste and user sensors, display and projector when the external proximity sensor detects no passersby. The PLC 300 can be programmed to turn the ancillary components on when users are present. This intermittent use of ancillary components saves energy. Certain areas of the controlling component may be activated or deactivated according to different methods. In certain embodiments, the activation of discrete controlling components can be implemented through a MOSFET component, a relay, or through different pins on the processor directly for areas of the circuit with lower current requirement. By intermittently monitoring and turning off circuits of the controller when those circuits are not required for operation, the device conserves energy.

Another embodiment includes a controlling component, a PLC, programmed to regulate the battery charger to eliminate battery charger energy consumption when solar power is insufficient for charging. The PLC is programmed to actively monitor wattage from the solar panel and to turn off the controller when the wattage drops below a threshold voltage. The battery charger is turned on when adequate voltage on the panel is reached, and off when it is not. Since many battery chargers require some activation energy from the battery to begin the charging process, the controlling component is programmed to supply the activation energy when solar energy is available. Alternatively, a blocking diode can be used to keep current from flowing from the battery to the battery charger. In such configuration, no energy is able to pass from the battery 318 to the battery charger; it is only able to come from the solar panel 312 when it has sufficient voltage to charge the battery 318.

The battery charger can require activation energy to charge the battery 318. Without this activation energy, it blocks any current from going through the charger to the battery 318. By placing a resistor 314 between the positive lead of solar panel 312 and positive lead of charger, solar panel 312 provides activation energy when there is sunlight reaching the solar panel 312. Once operating, the charger is the lower resistance path, so energy flows through the charger to the battery 318.

In one embodiment, the display 332 is a lighted sign, a scrolling panel, or other display method exhibiting information or advertising, which may include sound. The display 332 may be activated intermittently. The intermittent powering reduces the energy budget. In this embodiment, the intermittent-use feature may be used in controlling the lighting of the device. Cycling the lighting at very rapid duty cycles that are invisible to the human eye, energy can be conserved. In an alternative embodiment, the lighting may be pulse modulated at slower cycles, thereby conserving energy and permitting variations in the level of display illumination. In addition, the display 332 can be illuminated in segments. In a related embodiment, the display 332 can be programmed to be on only when a person passes by. This is accomplished by use of a proximity sensor, which engages the light to turn on when a user is within a predetermined distance away from the container. In yet another embodiment, the display 332 may be controllable via wireless receiver from a base location. For example, the base station may want to post an electronic message such as an advertisement or emergency message on each receptacle, for example, "evacuation route: head south," or a message that, for example, the waste will next be collected at 2 PM on Tuesday, or a bus schedule with real-time updates.

In another embodiment, PLC 300 is able to disengage energy draws when voltage is low. For example, in many settings, the device powers displays as discussed above. The PLC 300 can be programmed to disengage these displays from the electricity source (e.g., battery 318) when the voltage is low.

In some embodiments, PLC 300 can disengage electricity to the motors of a scrolling display when voltage is insufficient to power the display's motors. The PLC-powered a relay to connect electricity to a display including signage with a motor, only when there is sufficient voltage to power the motor. Additionally, the PLC 300 can be programmed to power the sign's motors only when the information to be displayed is likely to be beneficial. For example, a restaurant advertisement might be usefully displayed at lunch hour (and not at other times). In addition, such a sign can be programmed to scroll the sign at greater intervals if power is insufficient to do so more often. In addition, the PLC 300 can be programmed to rotate or change the display for different audiences and times of day, for example to advertise a Café before breakfast and a restaurant before dinner.

PLC 300 can also be programmed to search for a particular source of energy. In a device that is intermittently connected to the power grid, for example, the PLC 300 can be programmed to default to solar power source unless the device is connected to the grid. When connected in, the unit's energy-storing capability absorbs large fluctuations in energy use, which lowers the peak current that the machine draws. This can be advantageous because utility-supplied electricity charges may be based on both total draw and peak draw. In some embodiments, this programming reduces peaks, resulting in lower electricity costs. For a device that is, at times, charged by a utility-supplied electrical source, the PLC 300 and a real time clock program can charge the battery during "off peak" times when electricity rates are lower. Alternatively, it may charge the battery 318 when AC power is connected, and use photovoltaic energy when not plugged in. This may be accomplished with a PLC programmed to engage and disengage relays to connect a particular power source to a charging circuit or operating circuit. Alternatively, the relays may be wired to automatically provide activation energy to the relay with the highest energy.

In some cases, the devices are placed at a particular location that may or may not have access to sun light or to grid power. In other situations where the device is searching for the best source of energy, it may be programmed to use sunlight whenever there is sufficient sunlight and to use utility electricity when sunlight is not adequate to charge the battery 318. On PLC 300, program logic can direct using sunlight during the day, and utility power at night, if both are available all the time and the power demand are beyond that available from sunlight. Alternatively, when the battery 318 is charged off-site and replaced periodically, the PLC 300 can determine the optimal replacement frequency of the battery 318 and displays that information on the display 332, the status indicator panel 334 or lamps 336, or transmit the information wirelessly via transmitter/receiver 324.

A PLC and electronics that enable recharging of the energy storage system by another source, such as from power provided by a collection truck, can also be implemented in additional embodiments contemplated. Also contemplated, as another source of power, can utilize ambient radio waves.

PLC 300 can also be programmed to track solar derived voltage over a period of time, and if voltage is falling, the PLC 300 can turn on an indicator (on the device or at a remote location) telling staff that the device or attached solar panel is placed in an unsatisfactory location or orientation and must be moved, or that the battery 318 is failing and must be replaced. This can be advantageous because there are often natural peaks and valleys in voltage that must be "averaged out" in order to determine if a location or cell/reflector orientation requires alteration. By monitoring voltage over three weeks, for example, cloudy weather lows and sunny weather highs are incorporated into a calculation for more accurate placement evaluation.

Further, the PLC 300 can be programmed to allow for a variety of settings controlled by the staff personnel. For example, the PLC 300 can receive a signal from a potentiometer, which is used to adjust the desired display lighting levels, voice volume, microphone sensitivity or other setting. Such settings can also be controlled wirelessly via the PLC 300, transmitter and receiver 324.

In some embodiments, the PLC 300 can include bomb-sensing logic. The PLC 300 can be programmed to engage a relay to turn on an explosives detector 328 when the machine is used. The PLC 300 can be programmed to disconnect the detector 328 from the electrical system to save energy, and the electrical system can be attached to the detector 328 via relays so this disconnect is physically possible. The explosives detector 328 can be connected directly to the daughter PLC 302 so that if malicious substances are detected, the main PLC 300 can be removed from sleep mode immediately. The device can be outfitted with a camera that is activated by the opening of the insertion opening. The device may store a photo of everyone who deposits anything into the machine or vandals who abuse the device (e.g., kicking, placing lit paper in the device). Picture storage can be by, for example, a flash memory device or any other memory device. Photos can be wirelessly transmitted to a remote location, particularly if a sensor detects that the device suffered abuse.

In some embodiments, a tracking system, such as a global positioning system ("GPS") or other suitable tracking device can be included, as shown as an "Accessory" schematically in FIG. 3, 326. The ability to locate a device can provide theft recovery capability, quick logistical analysis, among other advantages. Such functions can also be configured to be switched on and off by the PLC 300 to reduce energy consumption.

Additionally, in another embodiment a PLC 300 can be programmed to engage a solenoid or other actuator which locks the insertion opening when the waste chamber is full. This reduces bin overflow/overfilling.

Figure 4A:
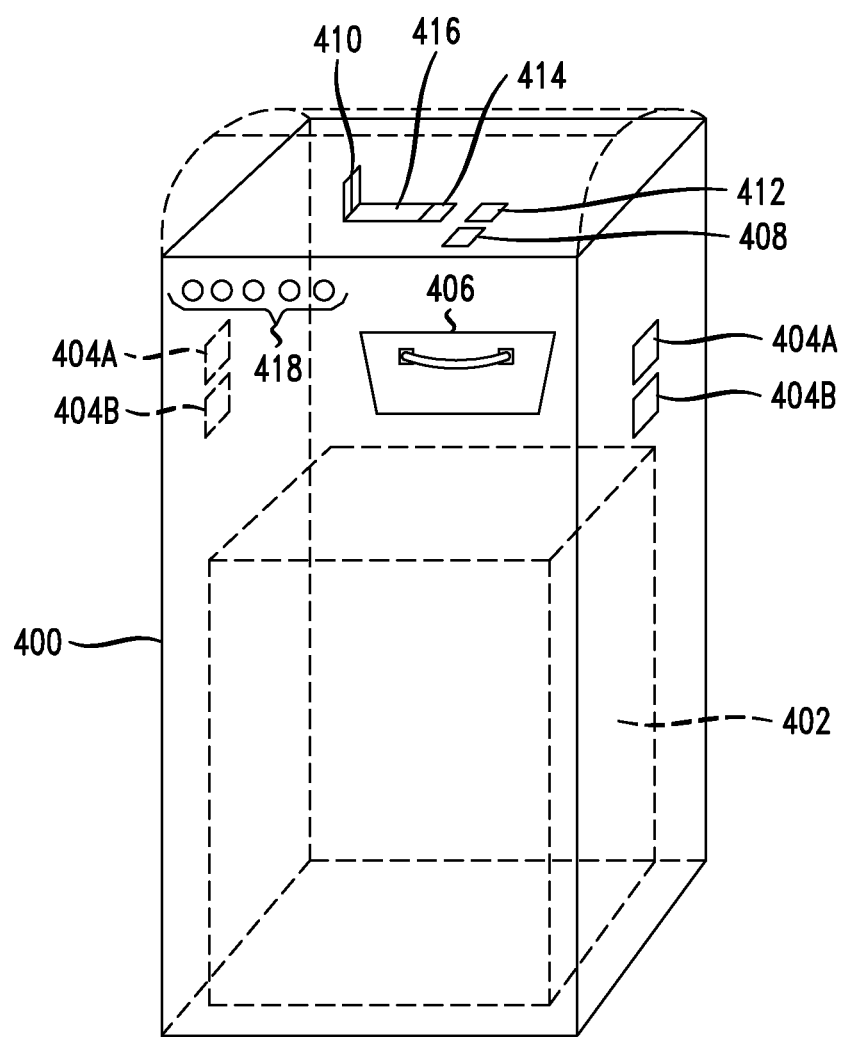
FIGS. 4A-C illustrate example storage receptacles.
Figure 4B:
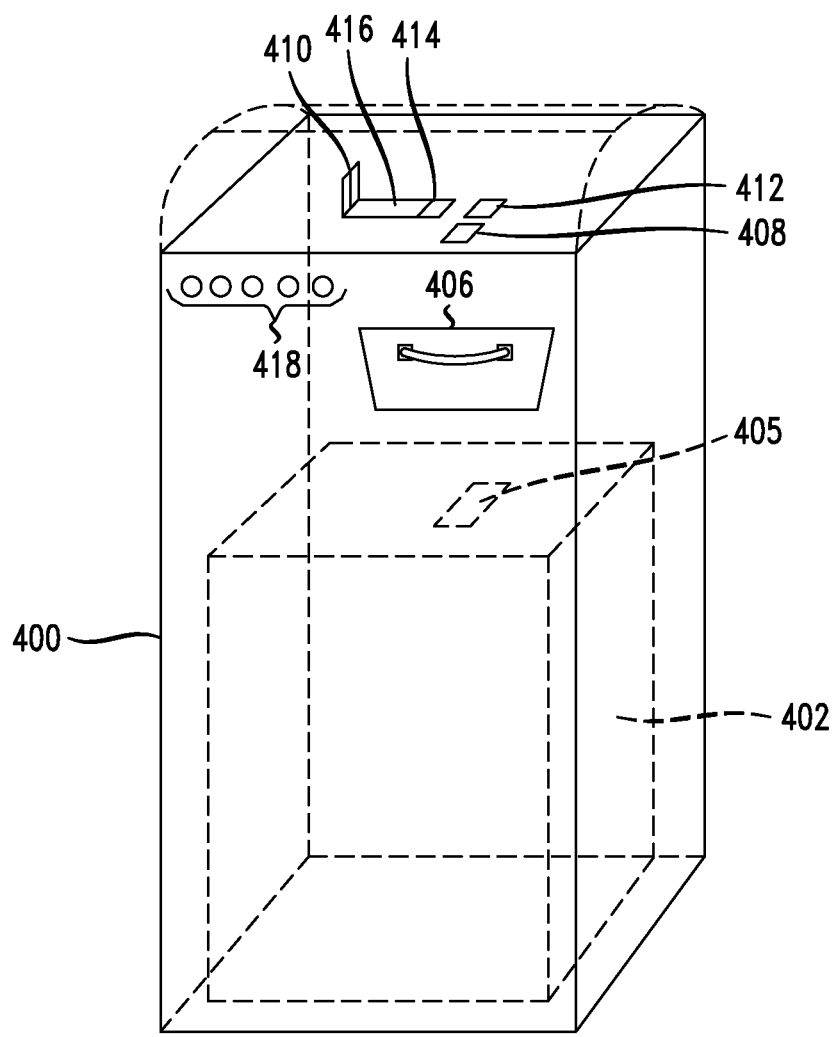
Figure 4C:
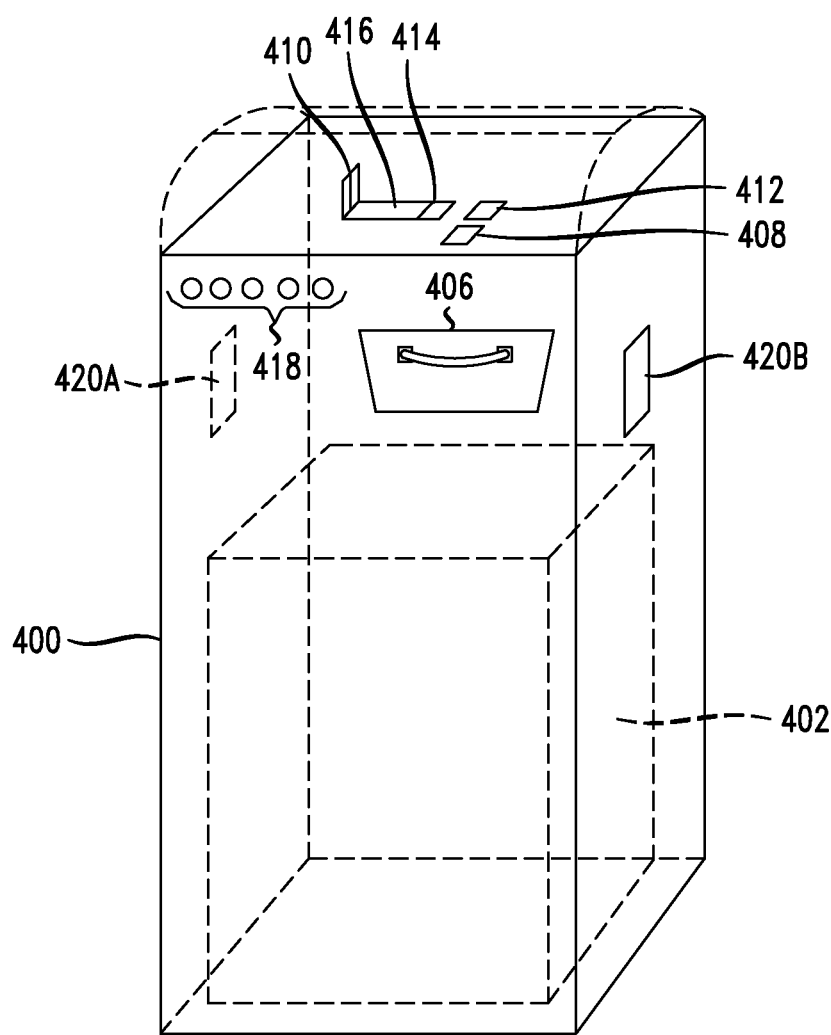

The disclosure now turns to FIGS. 4A-C, which illustrate exemplary storage receptacles. The storage receptacle 400 includes a bin 402 for storing content items, and a door 406 for opening the storage receptacle 400 to throw or deposit items in the bin 402. The storage receptacle 400 can have one or more sensors 404A-B, such as photoeye sensors, placed above the bin 402 for detecting the fullness state of the bin 402. The sensors 404A-B can be positioned in one or more modules attached to the storage receptacle 400 as further described below. In some configurations, the storage receptacle 400 can include two modules, one on each side, and each module can include two or more sensors. Here, the sensors can be placed at different heights in relation to the bin 402. For example, the two modules can each include a lower sensor and a raised sensor. The sensors on each module can be activated and deactivated dynamically based on compaction modes, energy levels, power schemes, operation schemes, etc. For example, the lower sensors can be active when frequent compactions are desired. Since the sensors here are lower in relation to the bin 402, they will detect waste materials more frequently than the raised sensors and thus trigger more frequent compactions. On the other hand, if less frequent compactions are desired, the lower sensors can be automatically deactivated and the raised sensors activated. This way, the lower and raised sensors can be dynamically adjusted and flipped back and forth based on specific conditions, settings, policies, schemes, and so forth.

In addition, each of the sensor modules can include an emitter and receiver. Moreover, the storage receptacle 400 can include compactor software or firmware configured to run self-diagnostics on each of the sensor modules and the normal paths, to ensure the storage receptacle 400 is running properly and to report any errors to the management console.

In some configurations, the storage receptacle 400 can also include a sonar sensor 408 to detect objects in the receptacle 400 and calculate the fullness state of the receptacle 400. As one of ordinary skill in the art will readily recognize, the sonar sensor 408 and sensors 404A-B can also be placed in other locations based on the size and/or capacity of the receptacle 400, storage requirements, storage conditions, preference settings, etc. The signal transmitted and sensed in order to determine trash levels can be any frequency (IR, visual range, etc.) and at any pulse rate. Further, while two upper sensors (404A, 404C) and two lower sensors (404B, 404D) are shown, any number and combination of sensors, transmitters, and receivers could be applied in various places within the receptacle 400. The storage receptacle 400 can also include other types of sensors, such as an infrared sensor, a temperature sensor, a hall effect sensor, an encoder sensor, a motion sensor, a proximity sensor, etc. The sonar sensor 408 and sensors 404A-B can sense fullness at regular intervals, and/or based on manual inputs and/or a pre-programmed schedule, for example. Moreover, the sonar sensor 408 and sensors 404A-B are electrically connected to the printed circuit board (PCB) 416. Further, the sonar sensor 408 and sensors 404A-B can be actuated by the PCB 416, which can be configured to control the various operations of the storage receptacle 400.

The PCB 416 can control electrical functions performed by the storage receptacle 400. The electrical functions controlled by the PCB 416 can include, for example, running compactions by actuating a motor; sensing waste or recyclables volume inside the receptacle 400 using a sensor at regular or programmable intervals, such as sensors 404A-B; changing status lamps 418 at regular and/or programmable thresholds to/from a color indicating that the receptacle 400 is not full (e.g., green), to/from a color indicating that the receptacle 400 is almost full (e.g., yellow), to/from a color indicating that the receptacle 400 is full (e.g., red); collecting data and transmitting the data to another device; receiving data from another device; managing a power mode; measuring and managing a current; performing diagnostics tests; managing a power source; etc. The motor controller 410 can enable voltage to be applied across a load in either direction. The PCB 416 can use the motor controller 410 to enable a DC motor in the receptacle 400 to run forwards and backwards, to speed or slow, to "brake" the motor, etc.

The storage receptacle 400 includes a transmitter 412 and a receiver 414 for sending and receiving data to and from other devices, such as a server or a remote control device. Accordingly, the storage receptacle 400 can transmit and receive information such as instructions, commands, statistics, alerts, notifications, files, software, data, and so forth. The transmitter 412 and receiver 414 can be electrically connected to the PCB 416. This way, the transmitter 412 can transmit data from the PCB 416 to other devices, and the receiver 414 can receive data from other devices and pass the data for use by the PCB 416. In this regard, a user who is checking the status of the receptacle could drive down the street near the device (say within a wireless range, such as Bluetooth or WIFI, for example), not even get out of their vehicle, but receive a signal indicating that all is well, that the trash needs to be emptied, or that a repair or cleaning is needed.

Status lamps 418 can provide an indication of the status of the storage receptacle 400. For example, the status lamps 418 can indicate the fullness state of the storage receptacle 400. To this end, the status lamps 418 can be configured to display a respective color or pattern when the storage receptacle 400 is full, almost full, not full, etc. For example, the status lamps 418 can be configured to flash red when the storage receptacle 400 is full, yellow when the storage receptacle 400 is almost full, and green when the storage receptacle 400 is not full. Moreover, the status lamps 418 can be LED lights, for example.

The status lamps 418 can also be configured to flash in various patterns to indicate various other conditions. For example, the status lamps 418 can be configured to flash at the same time and in combination to show that the receptacle 400 is full. The status lamps 418 can also be configured to flash in different patterns or times or colors to show troubleshooting status information for example. In some cases, the status lamps 418 can be configured to flash in a predetermined manner to show that a door of the receptacle is open, a component is damaged, an obstacle is stuck, an operation is currently active, etc.

As one of ordinary skill in the art will readily recognize, the receptacle 400 can include other components, such as motors, sensors, batteries, solar panels, displays, relays, chargers, GPS devices, timers, fuses, resistors, remote control devices, cameras, etc. However, for the sake of clarity, the receptacle 400 is illustrated without some of these components.

In some configurations, the storage receptacle 400 can be configured to implement dirt sensing technology. The dirt sensing technology can use firmware or other software instructions to monitor the signals, such as infra-red signals, through the sensors on the receptacle 400, and use this data to determine how dirty the detection sensors have become. For example, in some cases, a "clean" sensor 404D can take around 6 38 khz pulses transmitted from a transmitter 404C before the signal is detected. As the sensor becomes more and more, dirty it typically takes longer to detect the signal, and may even take 20 38 khz pulses, for example. This data can be used to provide a scale of how dirty the sensor has become and provide feedback to the user before the sensor becomes completely blocked. Once the sensor is blocked, the capacity of the compactor can be reduced since compactions may no longer performed. As one of ordinary skill in the art will readily recognize, the frequencies and number of pulses discussed herein are provided for non-limiting illustration purposes. In fact, the frequencies used and number of pulses associated with specific dirt levels can vary based on a number of factors, such as hardware and preference settings. Moreover, other applications, frequencies and number of pulses are contemplated herein.

As previously indicated, the receptacle 400 can be configured to operate at a reduced energy usage level. In some cases, the receptacle 400 can also include a prevention mechanism to ensure that the receptacle does not run at zero capacity. Here, the receptacle 400 can be prevented from shutting off completely, and configured to run at least at a threshold level.

Furthermore, since the voltage of a battery does not generally indicate the actual capacity in a battery, it can be beneficial to understand what capacity is available to ensure accurate machine operation and dead battery notification. To this end, the machine firmware can analyze voltage drops that occur after a compaction occurs at what current, and can determine a ratio which can provide feedback and indications of the true battery capacity. The firmware can use this ratio to limit compactions and or notify the management console of the battery state. As previously mentioned, the management console can be a console on the actual storage receptacle 400 and/or a remote device, such as a server, for example.

Referring to FIG. 4B, the storage receptacle 400 can include a reflective portion 405 at the top of the bin 402 and facing towards components 408 and 412. The components 408 and 412 can be a transmitter and a receiver. For example, the component 408 can be a transmitter configured to send a signal to the reflective portion 405. The component 412 can be a receiver configured to receive a signal reflected from the reflective portion 405, which can be originally transmitted by the transmitter, component 408. Thus, the transmitter 408 can send signals down to the reflective portion 405 to be reflected back to the receiver 412. This configuration can be implemented to test a path from the top of the storage receptacle 400 to a top of the bin 402, for example. In some cases, the components 408 and 412 can be situated to test a path between a door on the storage receptacle 400 and the bin 402.

The reflective portion 405 can be a mirror, for example, or any other reflective substance. In some cases, the reflective portion 405 can be at least some of the contents inside the bin 402, which can reflect light or signals. For example, the reflective portion 405 can be trash inside the bin 402.

Referring to FIG. 4C, the storage receptacle 400 can include a reflective portion 420A and a module 420B. The module 420B can include one or more sensors. In some configurations, the module 420B can include a transmitter and a receiver. Here, the transmitter can send a signal to the reflective portion 420A, and the signal can be reflected back to the receiver. In other words, the transmitter in the module 420B can send a signal to a receiver in module 420B by bouncing the signal from the reflective portion 420A. In some cases, the storage receptacle 400 can include additional reflective portions to allow the transmitter and receiver to be placed in different areas and/or positions while still maintaining the capability to communicate a signal between each other by bouncing the signal several times on various portions of reflective material.

Figure 5:
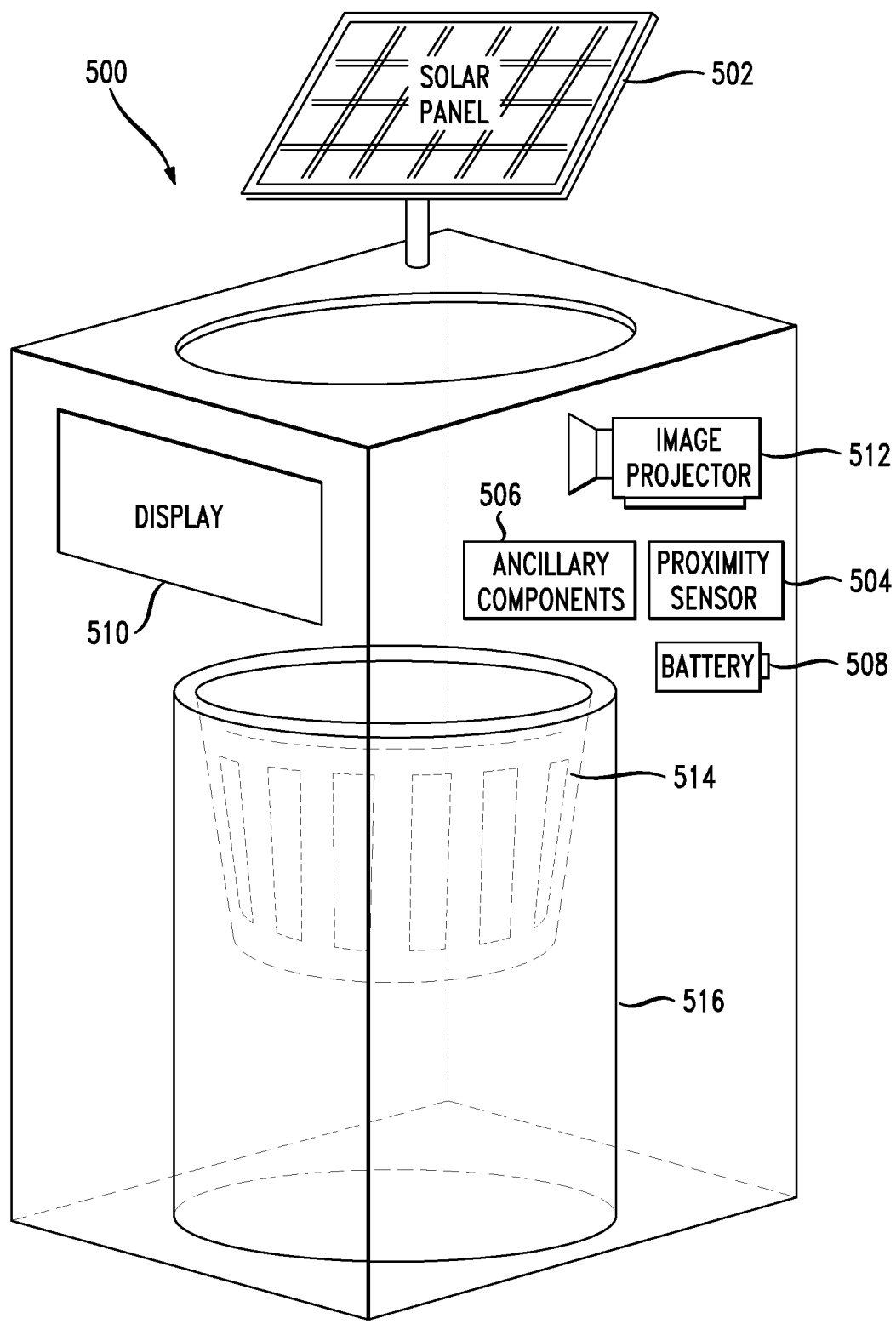
FIG. 5 illustrates a diagram of an example dumpster.

FIG. 5 illustrates a diagram of an example dumpster 500. The dumpster 500 can include a solar panel 502 for energy and a battery 508 as previously described. The dumpster 500 can also include one or more sensors, such as a proximity sensor 504, photoeye sensors, etc. Moreover, the dumpster 500 can include a display 510 and an image projector 512 to display messages, notifications, and images as previously described.

In addition, the dumpster 500 can include ancillary components 506, which can vary in different embodiments. For example, in some embodiments, the ancillary components 506 can include a camera, a speaker, a microphone, a scanner, an antenna, a tracking device, etc.

The dumpster 500 can also include a sleeve 514 placed on a bin 516 inside the dumpster 500 as further described below. The sleeve 514 can be placed over a bag in the bin 516 used to collect the waste materials inserted into the dumpster 500. This way, the sleeve 514 can be implemented to hold the bag in place and/or restrict a movement of the bag to prevent false detection of fullness levels as follows.

Figure 6A:
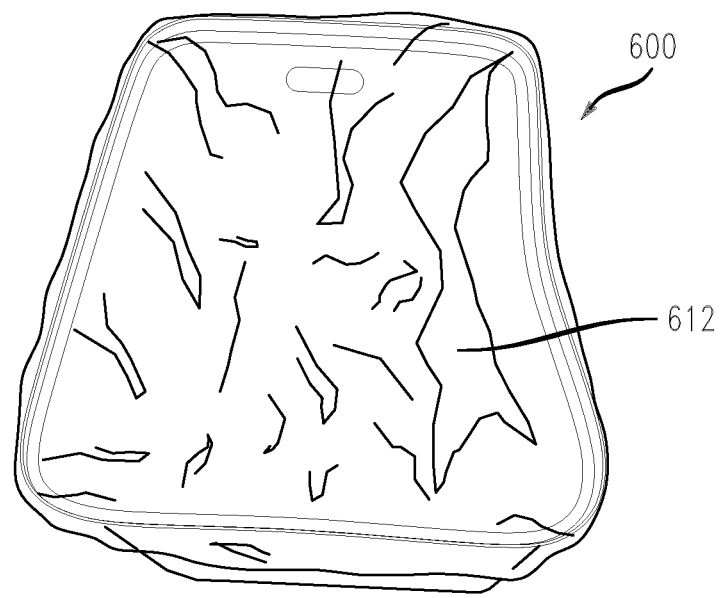
FIGS. 6A-B illustrate example bins for collecting items in a storage receptacle.
Figure 6B:
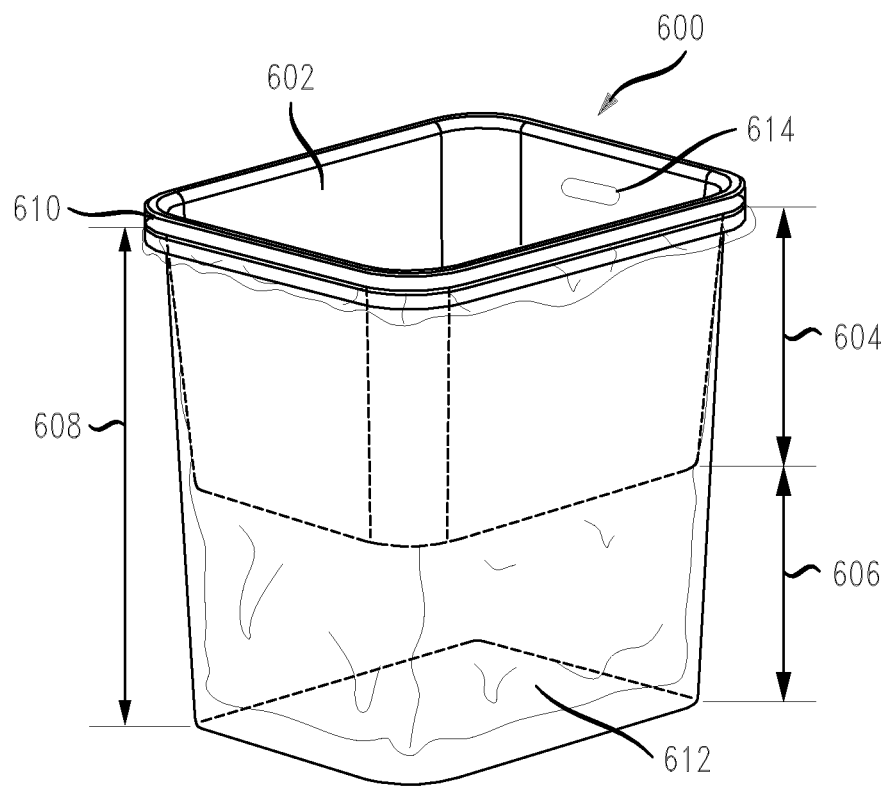

FIGS. 6A-B illustrate example bins 600 for collecting items in a storage receptacle, such as storage receptacles 400 or 500. As illustrated, a bin 600 can include a bag 612 placed over the inside of the bin 600 to hold and contain waste materials deposited into the bin 600. This way, the waste materials can be captured by the bag 612 and easily removed and carried away when the bin 600 is full, or at any unloading period. As illustrated in FIG. 6A, in some cases, the bag 612 can become "puffy" or filled with air inside the bin 600. This can at least partially block a path of a sensor's signal when detecting fullness levels, which can result in a false fullness detection. The bag 612 can also be lifted or moved by other forces or causes which can similarly result in the path of the sensor's signal becoming at least partially blocked similarly causing a false fullness detection. To remedy this problem, a sleeve 602 can be placed over the bin 600 and the bag 612 as illustrated in FIG. 6B and further described below.

Referring to FIG. 6B, the sleeve 602 can be placed over an inside of the bin 600 to hold the bag 612 in place and/or restrict a movement of the bag 612 in the bin 600. The sleeve 602 can be configured to prevent the bag 612 from becoming puffed by air or any other force. This can prevent a false fullness detection from a sensor resulting from puffiness of the bag 612. The sleeve 602 can be shaped and fitted according to the shape and size of the bin 600. Accordingly, the sleeve 602 can surround an inside portion of the bin 600 and extend a length 604 down the bin. The length 604 of the sleeve 602 can also vary in some embodiments. Moreover, in some cases, the sleeve 602 can tightly fit inside the bin 600. In some configurations, the sleeve 602 can be an insert configured to sit on, or attach or be coupled to, the bin 600 to restrict movement of the bag 612 on the bin 600.

The sleeve 602 can have a shape that is complimentary to a top portion 604 of the bin 600 such that an inside of the top portion 604 of the bag 612 is pressed tightly between or onto a surface of the sleeve 602 and an inner surface of the bin 600. In some embodiments, the sleeve 602 can include a rim 610 that extends over and fits on a top edge of the bin 600 to allow the sleeve 602 to sit on top of the bin 600. This way, the sleeve 602 can be placed on the bin 600, and the rim 610 of the sleeve 602 can prevent the sleeve 602 from sliding or moving down or lower into the bin 600. The rim 610 of the sleeve 602 that extends over the bin 600 can be a top edge of the sleeve 602. The rim 610 can include a flange or lip to hold a top edge of the sleeve 602 on top of the bin 600, and allow the top edge of the sleeve 602 to sit on a top edge of the bin 600.

Moreover, as previously mentioned, the sleeve 602 can be configured to run down a length 604 of the bin 600, and/or a length of the bag 606. For example, the sleeve 602 can run downwards into the bin until a threshold distance from the bottom of the bag 612 to the top of the bin 600 when placed over the bin 600. The length 608 of the bin 600 can be greater than the length 606 of the bag 612 and/or the length 604 of the sleeve 602. However, in some embodiments, the length 608 of the bin 600 can be similar or the same as the length 606 of the bag 612 and/or the length 604 of the sleeve 602. Indeed, in some embodiments, the length 604 of the sleeve 602 can extend up to, or below, the length 606 of the bag 612, such that the bag is completely, or almost completely, captured within the sleeve 602.

In some cases, the length 604 of the sleeve and/or the length 606 of the bag 612 can depend on how much movement, flexibility, or extension of the bag 612 is desired. The length 604 of the sleeve and/or the length 606 of the bag 612 can also depend on other factors, such as expected exposure to wind, type and amount of waste materials, and/or other forces that may be placed on the bag 612 and/or the sleeve 602. For example, if the bin 600 is expected to have a lot of exposure to high winds, the sleeve 602 can be configured to extend further down towards the bottom of the bag 612 or the bottom of the bin 600 to obtain an increased restriction of movement of the bag 612. Thus, the length 604 of the sleeve 602 can be modified for performance.

The sleeve 602 can have an opening in the top and bottom of the sleeve 602 so as to allow items to be deposited in the bin 600 without blocking the items or path of the items. In some cases, the sleeve 602 can be a hollow tube, insert, or container. The top opening of the sleeve 602 can provide access to the bin 600, and the bottom opening of the sleeve 604 can provide access to the bottom of the bag 612. Here, the sleeve 602 can maintain or hold the bag 612 at least partially extended, and can prevent the bag 612 from being lifted by forces beyond a threshold distance above the length 606 of the bag 612 when fully extended. In other words, the sleeve 602 here can hold the bag 612 fully or almost fully extended, and can restrict any upwards or horizontal movement of the bag 612 inside the bin 600. Thus, the sleeve 602 can prevent any forces, such as air, from lifting the bag beyond a threshold distance above the length 606 of the bag 600.

In some cases, the length 606 of the bag 612 can extend up to a distance from the length 608 of the bin 600. Thus, in such cases, the bag 612, when fully extended, can reach the bottom of the bin 600, or can otherwise reach within a distance above the bottom of the bin 600. To this end, the difference between the length 606 of the bag 612 and the length 608 of the bin 600 can vary based on one or more factors, such as the size and shape of the bag 612, the size and shape of the bin 600, particular preferences, expected external forces, the size and shape of the sleeve 602, etc. In some cases, if the difference in length between the length 606 of the bag 612 and the length 608 of the bin 600 is reduced, the amount of air that can accumulate under the bag 612 can be reduced. Therefore, in some embodiments, the difference in such distance or length can be minimal.

The sleeve 602 can include one or more handles 614 to allow easy and simple removal of the sleeve 602 from the bin 600. Moreover, the sleeve 602 can be attached firmly to the bin 600 to prevent the bag 612 from sliding down the bin or falling off the bin. Also, the sleeve 602 can be made from any solid material, and can have up to a threshold level of flexibility and/or strength, depending on the configuration and preferences.

Figure 7A:
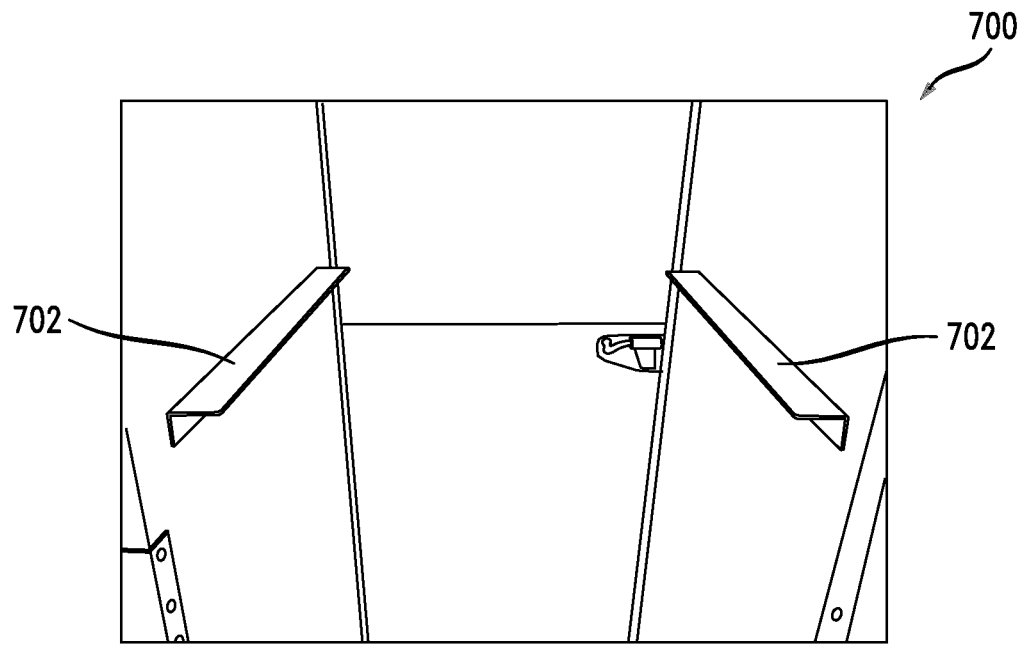
FIGS. 7A-B illustrate example bracket systems for installing a bin.
Figure 7B:
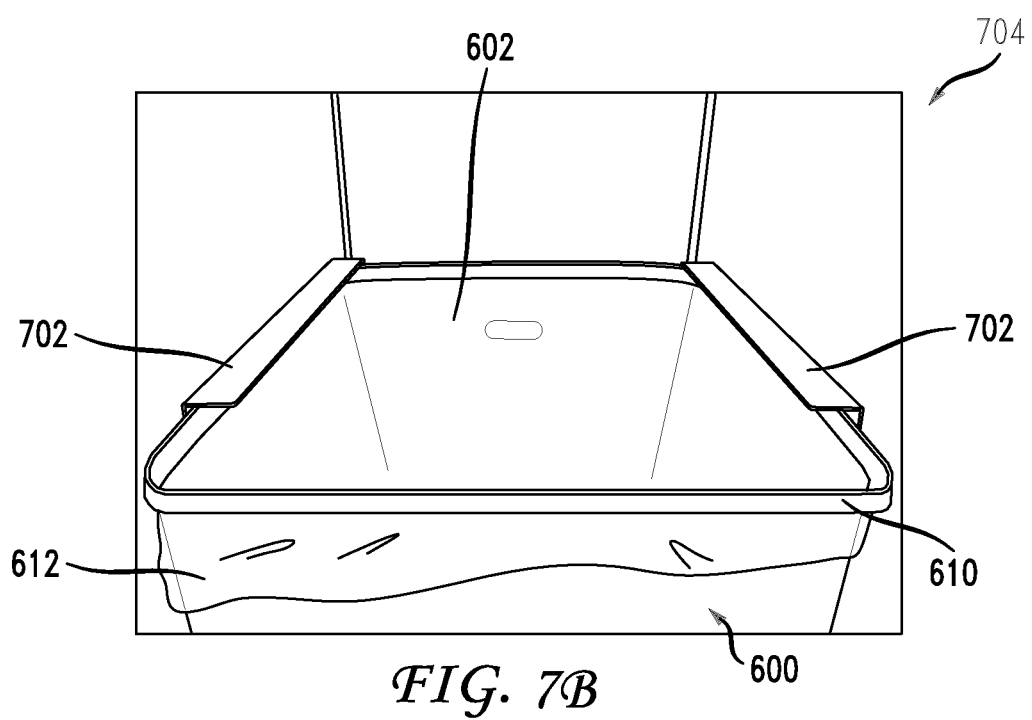

FIGS. 7A-B illustrate example bracket systems for installing a bin. FIG. 7A illustrates a configuration 700 of an example bracket system 702 without a bin, and FIG. 7B illustrates a configuration 704 of an example bracket system 702 with an installed bin 600. The bracket system 702 can be included in the receptacle to hold the bin 600 and sleeve 602 in place. The bracket system 702 can be located a distance above the bin 600 and sleeve 602 to prevent the bin 600 and sleeve 602 from being lifted or removed when the door is closed or open. The bracket system 702 can include flanges to secure the bin 600 and sleeve 602 in place and prevent the bin 600 from being lifted and/or removed from the enclosure. Moreover, the bin 600 and sleeve 602 can slide under the flanges, and the flanges can hold the bin 600 and sleeve 602 in place. The sleeve 602 can include a top edge or rim 610 that further secures the bin 600 and sleeve 602 under the flanges.

The flanges can restrict the movement of the bin 600 and the sleeve 602 to not only prevent the bin 600 and sleeve 602 from falling or being unintentionally removed, but also to prevent unnecessary or excessive movement of the bin 600 and sleeve 602, which can trigger a sensor in the enclosure. For example, if the enclosure is bumped, tilted, or moved, the flanges can restrict the subsequent movement of the bin 600 and sleeve 602 inside the enclosure, by holding the bin 600 and sleeve 602 in place and limiting the vertical movement of the bin 600 and sleeve 602.

Figure 8:
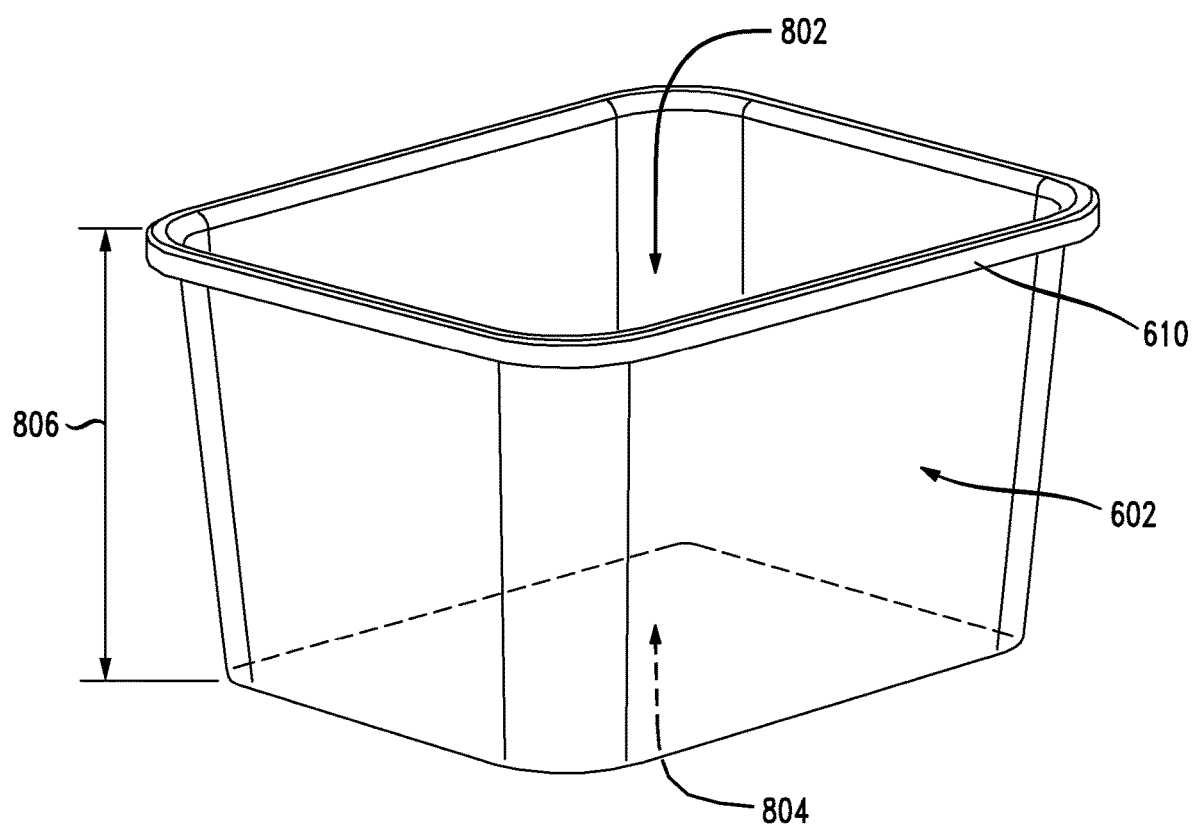
FIG. 8 illustrates a schematic of an example sleeve.

FIG. 8 illustrates a schematic of an example sleeve 602. The sleeve 602 can be placed over a bin 600 in an enclosure, as previously described. The sleeve 602 can include a top opening 802 and bottom opening 804, which can create a hollow tube or insert for fitting inside the bin 600 with the bag 612. The sleeve 602 can be shaped according to a shape of the bin 600 to be used with the sleeve 602. Moreover, the sleeve 602 can include a top edge or rim 610 configured to extend a distance over the bin 600. This way, the sleeve 602 can be placed on top of the bin 600 and the rim 610 can prevent the sleeve 602 from sliding downward inside the bin and can help maintain the sleeve 602 on the bin 600. In addition, the rim 610 can be used to secure the sleeve 602 and bin 600 with the bracket system 702 as illustrated in FIG. 7B, configuration 704. In this manner, the sleeve 602 can hold or maintain an upper portion of the bag 612 adjacent to the upper portion of the bin 600 and out of the way of the trash and sensing area.

In some cases, the sleeve 602 can include handles 614 to allow a user to easily remove the sleeve 602 from the bin 600. Moreover, the length 806 of the sleeve 602 can vary in different configurations based on one or more factors such as the length 606 or height of the bag 612, the length or height 608 of the bin 600, the size of the bin 600, expected external or internal forces, the path of a signal from a sensor used to detect fullness levels, a type of sensor, etc.

Figure 9:
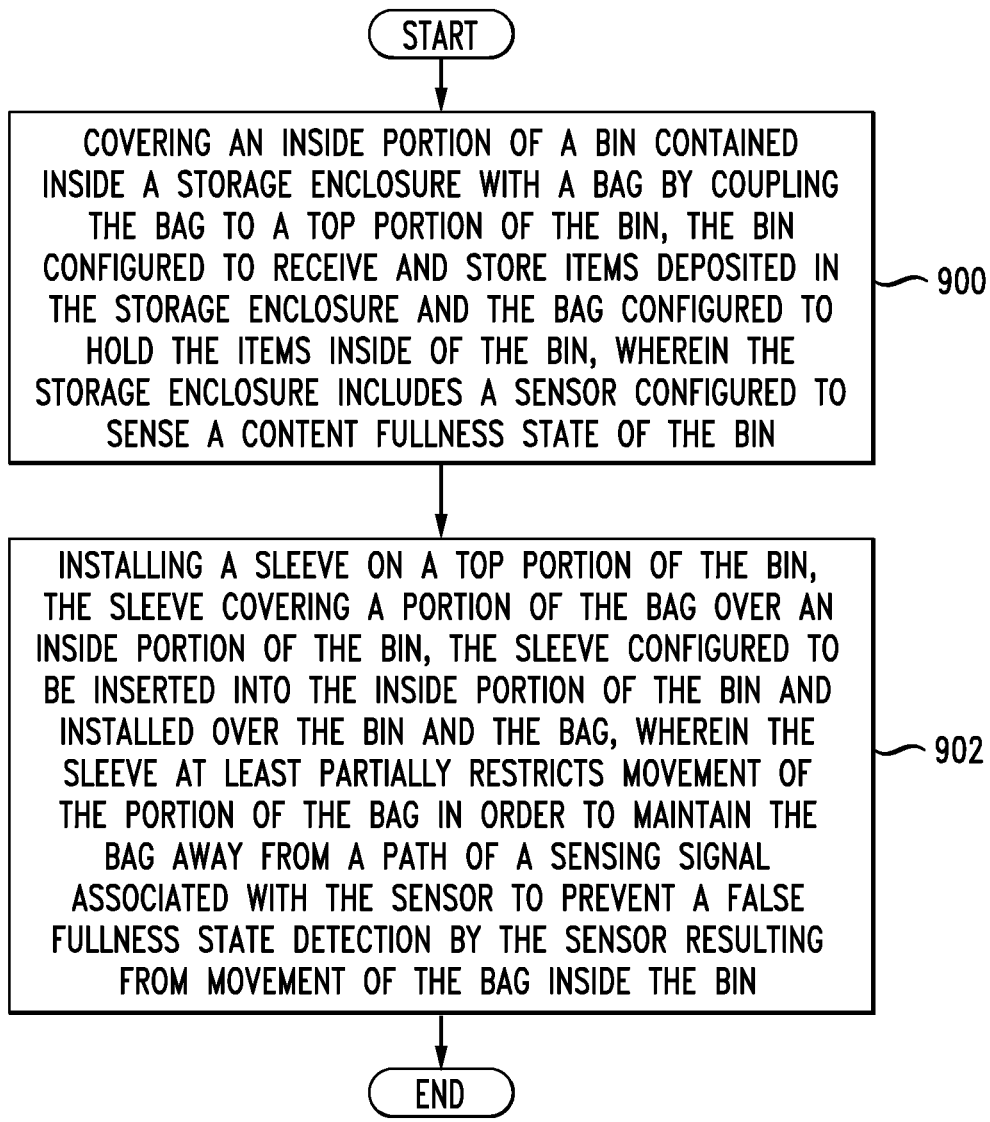
FIG. 9 illustrates an example method embodiment.

Having disclosed some basic system components and concepts, the disclosure now turns to the example method embodiment shown in FIG. 9. The steps outlined herein are illustrative and can be implemented in any combination thereof, including combinations that exclude, add, or modify certain steps.

The method begins and an inside portion of a bin contained inside a storage enclosure is first covered with a bag by coupling the bag to a top portion of the bin, the bin configured to receive and store items deposited in the storage enclosure and the bag configured to hold the items inside of the bin, wherein the storage enclosure includes a sensor configured to sense a content fullness state of the bin (900). Next, a sleeve is installed on a top portion of the bin, the sleeve covering a portion of the bag over an inside portion of the bin, the sleeve configured to be inserted into the inside portion of the bin and installed over the bin and the bag, wherein the sleeve at least partially restricts movement of the portion of the bag in order to maintain the bag away from a path of a sensing signal associated with the sensor to prevent a false fullness state detection by the sensor resulting from movement of the bag inside the bin (902).

The bin with the sleeve can then be placed inside the storage enclosure and enclosed by a bracket system coupled to the storage enclosure, the bracket system configured to at least partially restrict movement of the bin and the sleeve and prevent the bin and the sleeve from being unintentionally removed. Once the sensor detects a fullness of the bin and the bag, the sleeve can be removed to allow the contents of the bag to be removed and discarded and the bag (or a different bag) to be placed back on the bin. In some cases, the sleeve can be removed by a user at any time, even before a fullness signal from the sensor.

In some embodiments, the sleeve is configured to position the bag inside the bin in a manner that ensures the bag remains within a distance of an inside bottom of the bin, and the sleeve is a hollow tube shaped according to a shape of an inside portion of the bin.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

The invention claimed is:

1. A sleeve made from a solid material, the sleeve comprising:
 an interior flange that is complementary to at least a top interior portion of a storage bin contained in a storage enclosure, the interior flange configured to overlap a portion of a bag placed with the storage bin to keep the bag from blocking a path of a sensing signal associated with a sensor configured in the storage enclosure, and the interior flange being configured such that at the top interior portion of the storage bin, the interior flange is between objects placed in the storage bin and the bag; and
 a top edge configured to extend over a top edge portion of the storage bin.

2. The sleeve of claim 1, wherein the sleeve is configured to prevent the bag from becoming puffed and to ensure that a bottom portion of the bag remains within a distance of an inside bottom of the storage bin.

3. The sleeve of claim 1, wherein the sleeve encloses a portion of the bag inside the storage bin such that the bag is between the interior flange of the sleeve and the storage bin, and wherein the sleeve has a top opening configured to be positioned at the top edge portion of the storage bin and a bottom opening facing a bottom portion of the storage bin.

4. The sleeve of claim 1, wherein the sleeve is configured to be coupled to an inside portion of the storage bin.

5. The sleeve of claim 1, wherein the sleeve is configured to be installed over at least a portion of the bag such that, when the bag is in the storage bin, the interior flange of the sleeve maintains an upper portion of the bag adjacent to the top interior portion of the storage bin.

6. The sleeve of claim 5, wherein the interior flange of the sleeve further comprises a hollow tube shaped complementary to a shape of the storage bin and is configured to be fitted inside the storage bin such that the bag is positioned between the sleeve and the storage bin.

7. A storage unit comprising:
 a storage bin contained inside a storage enclosure, the storage bin configured to receive and store items deposited in the storage enclosure, and wherein an inside portion of the storage bin is at least partially covered by a bag placed inside the storage bin to hold the items deposited in the storage enclosure;
 a bin sleeve made from a solid material and comprising (1) an interior flange having a shape configured to be complementary to at least a top interior portion of the storage bin within in the storage enclosure and (2) a top edge of the bin sleeve configured to extend over a top edge portion of the storage bin; and
 a sensor configured to sense a contents fullness state of the storage bin, the interior flange of the bin sleeve configured to overlap a portion of the bag configured with the storage bin to keep the bag from blocking a path of a sensing signal associated with the sensor.

8. The storage unit of claim 7, further comprising:
 a processor configured to control operations performed by the sensor;
 a battery for powering the sensor and the processor; and
 a solar panel connected to the battery.

9. The storage unit of claim 8, further comprising a transmitter configured to communicate with a remote device, wherein the processor is configured to control operations of the transmitter.

10. The storage unit of claim 9, wherein the transmitter is configured to send a warning message, the warning message being based on at least one of a battery status and a fullness status of the storage bin.

11. The storage unit of claim 10, wherein the transmitter is configured to receive operating instructions from a remote device.

12. The storage unit of claim 7, wherein the interior flange of the bin sleeve at least partially restricts a movement of the bag, and wherein the interior flange of the bin sleeve is configured to hold the bag inside the storage bin in a manner that ensures the bag remains within a distance of an inside bottom of the storage bin and away from the path of the sensing signal associated with the sensor to prevent a false fullness state detection by the sensor resulting from movement of the bag inside the storage bin.

13. The storage unit of claim 7, wherein the interior flange of the bin sleeve encloses a portion of the bag inside the storage bin, and wherein the bin sleeve has a top edge configured to be positioned at the top edge portion of the storage bin and the interior flange of the bin sleeve comprises a bottom opening facing a bottom portion of the storage bin.

14. The storage unit of claim 7, wherein the interior flange of the bin sleeve further comprising a hollow container configured to prevent the bag from becoming puffed by restricting a movement of the bag such that at least a portion of the bag is prevented from being lifted beyond a threshold distance above an inside bottom of the storage bin.

15. The storage unit of claim 7, further comprising:
a door on the storage enclosure for providing outside access to contents inside the storage enclosure, the contents inside the storage enclosure comprising at least one of the storage bin, the bin sleeve, and items deposited in the storage enclosure; and
a bracket system coupled to the storage enclosure, the bracket system configured to at least partially restrict movement of the storage bin and the bin sleeve and prevent the storage bin and the bin sleeve from being lifted out of the storage bin or raised horizontally while the storage bin and the bin sleeve are within the storage enclosure.

16. The storage unit of claim 7, further comprising ancillary electrical components comprising at least one of a voice recognition system, an audio speaker, a user sensor, a display, and a lighted sign.

17. A method comprising:
covering an inside portion of a storage bin with a bag by coupling the bag to a top portion of the storage bin, the storage bin configured to receive and store items deposited in a storage enclosure and the bag configured to hold the items inside of the storage bin, wherein the storage enclosure comprises a sensor configured to sense a content fullness state of the storage bin;
transmitting a signal from the sensor to sense the content fullness state of the storage bin; and
installing a bin sleeve on a top portion of the storage bin, the bin sleeve made from a solid material and comprising (1) an interior flange of the bin sleeve having a shape configured to be complementary to at least a top interior portion of a storage bin, the interior flange of the bin sleeve configured to overlap a portion of the bag configured with the storage bin to keep the bag from blocking a path of the signal associated with the sensor configured in the storage enclosure, the interior flange of the bin sleeve being between objects placed in the storage bin and the bag when the objects rest at the top portion of the storage bin and (2) a top edge of the bin sleeve configured to extend over a top edge portion of the storage bin.

18. The method of claim 17, further comprising placing the storage bin with the bin sleeve inside the storage enclosure and enclosed by a bracket system coupled to the storage enclosure, the bracket system configured to at least partially restrict movement of the storage bin and the bin sleeve and prevent the storage bin and the bin sleeve from being removed when a door of the storage enclosure is closed.

19. The method of claim 17, further comprising removing the bin sleeve from the storage bin to remove the bag from the storage bin.

20. The method of claim 19, wherein the bin sleeve is removed in response to the signal from the sensor indicating a threshold fullness level of the storage bin.

* * * * *